United States Patent
Iwasaki

[11] Patent Number: 6,147,813
[45] Date of Patent: Nov. 14, 2000

[54] ZOOM LENS

[75] Inventor: Yoichi Iwasaki, Saitama, Japan

[73] Assignee: Fuji Photo Film Co., Ltd., Kanagawa, Japan

[21] Appl. No.: 09/193,123

[22] Filed: Nov. 17, 1998

[30] Foreign Application Priority Data

Nov. 17, 1997 [JP] Japan .................................. 9-314748

[51] Int. Cl.$^7$ .................................................. G02B 15/14
[52] U.S. Cl. ........................................... 359/692; 359/716
[58] Field of Search .................................... 359/692, 679, 359/557, 687, 676, 690, 652, 716

[56] References Cited

U.S. PATENT DOCUMENTS

| | | | |
|---|---|---|---|
| 5,602,676 | 2/1997 | Estelle | 359/557 |
| 5,633,758 | 5/1997 | Ueda | 359/679 |
| 5,805,352 | 9/1998 | Kawamura | 359/692 |
| 5,808,811 | 9/1998 | Iyama | 359/692 |
| 5,995,298 | 11/1999 | Ohno | 359/692 |

FOREIGN PATENT DOCUMENTS 3-158815  7/1991  Japan .

Primary Examiner—Scott J. Sugarman
Attorney, Agent, or Firm—Young & Thompson

[57] ABSTRACT

A zoom lens consisting of a front lens group having a positive power and a rear lens group having a negative power. The front lens group is composed of a first lens having negative power and a second lens having a positive power. The first lens has at least one aspherical surface, and is spaced from the second lens by an air gap D2, wherein the zoom lens satisfies the following condition:

$$0 < D2/Fw < 0.1$$

wherein D2 is the air gap between the first and second lenses, and Fw is a total focal length of the zoom lens at a wide-angle terminal. The one aspherical surface of the first lens satisfies the following condition:

$$0.5 < |(C_{as} - C)/(N-1)/\Phi_{G1}| < 10$$

wherein C is a radius of curvature of a base surface of the aspherical surface, N is an index of refraction of a medium forming the first lens, $\Phi_{G1}$ is a power of refraction of the first lens, and $C_{as}$ is a local radius of curvature at a height Y relative to an optical axis, wherein $0.7\, Y_{max} < Y < 1.0\, Y_{max}$, and $Y_{max}$ is a maximum effective aperture of the first lens.

22 Claims, 28 Drawing Sheets

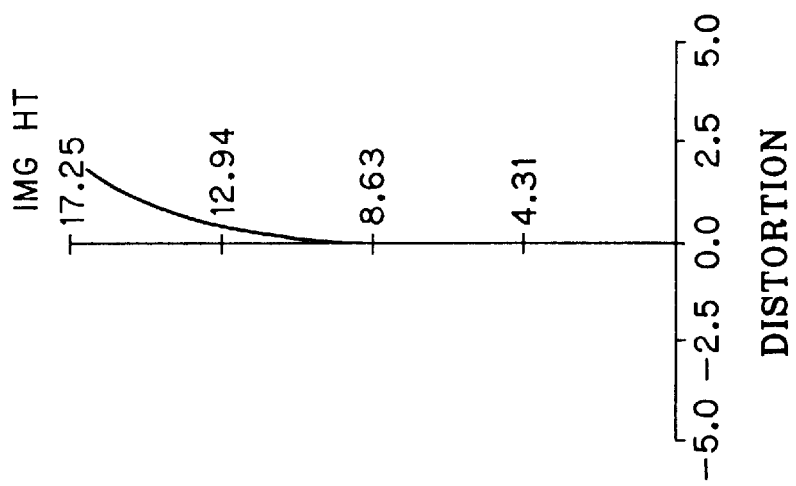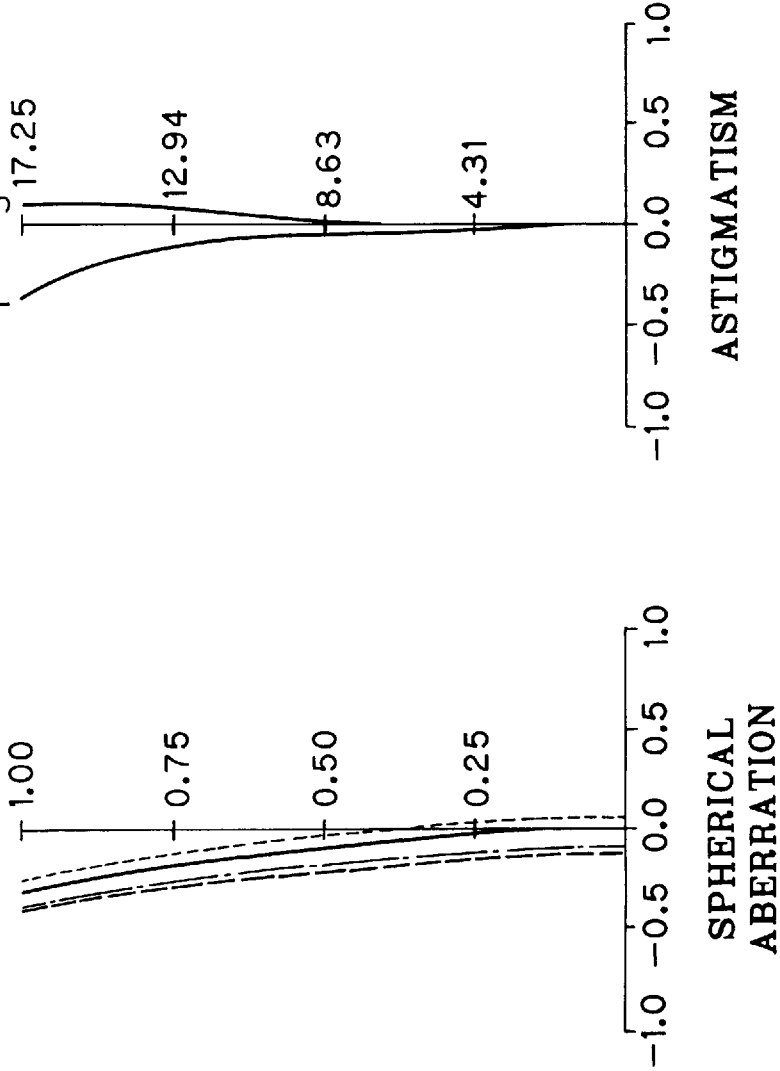

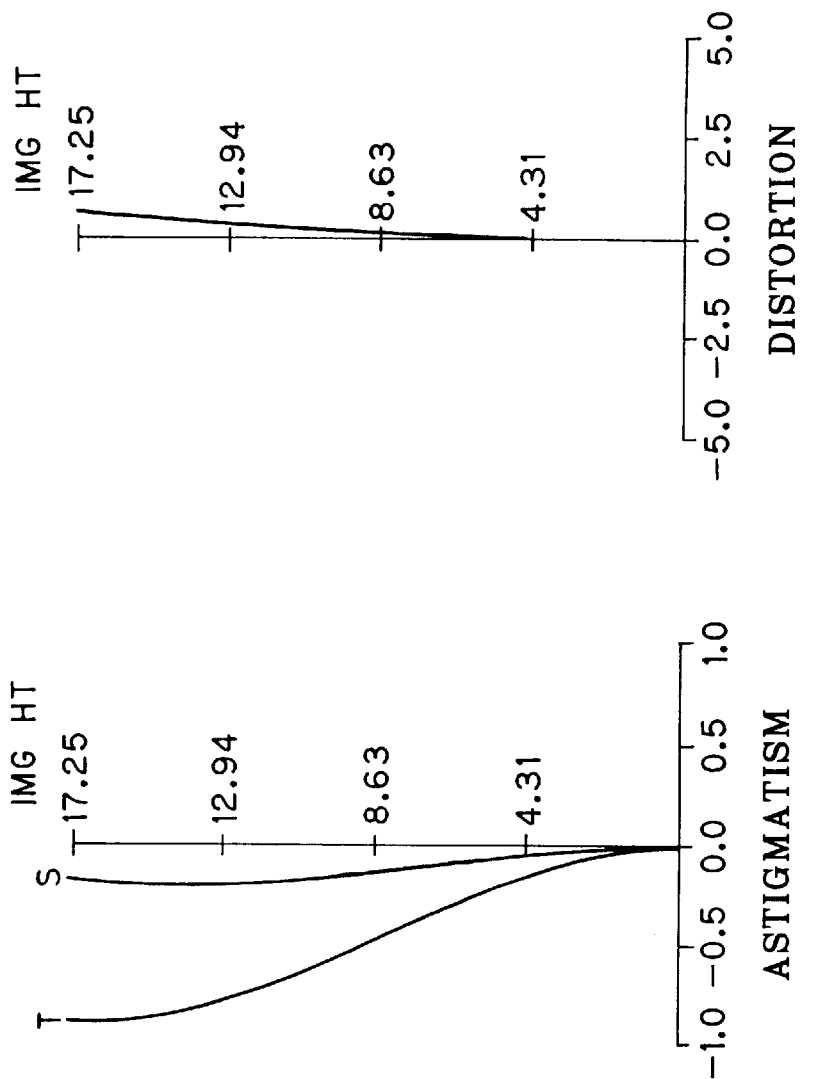
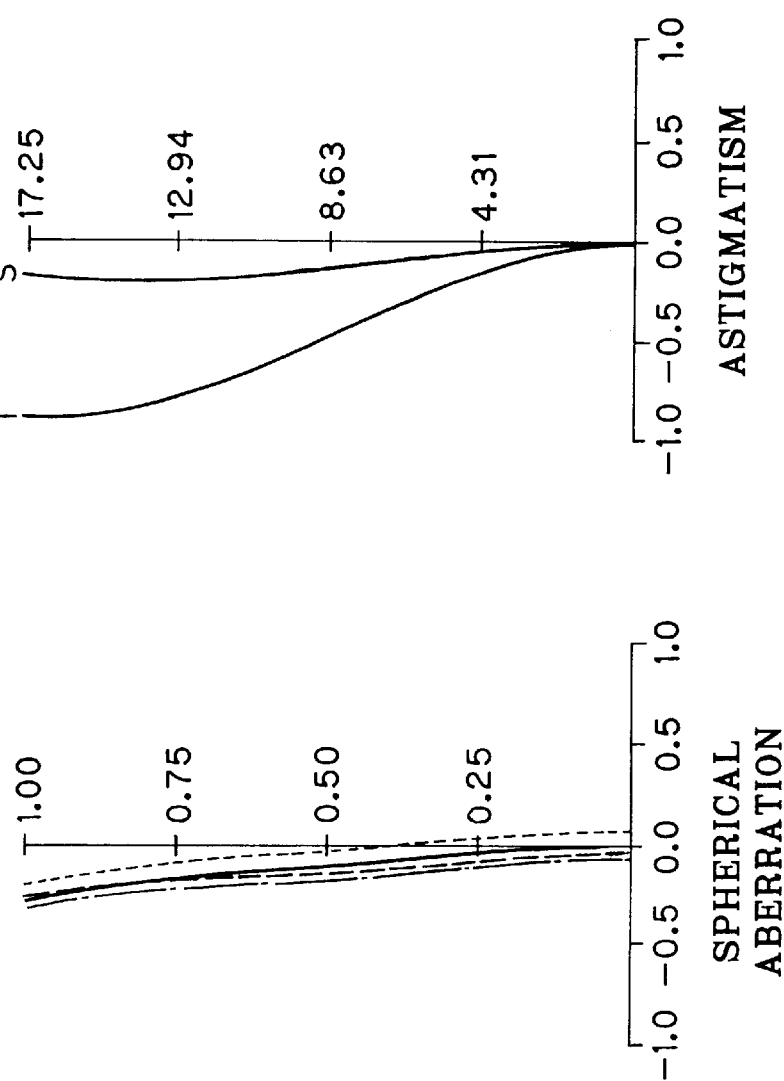
FIG. 3A  FIG. 3B  FIG. 3C

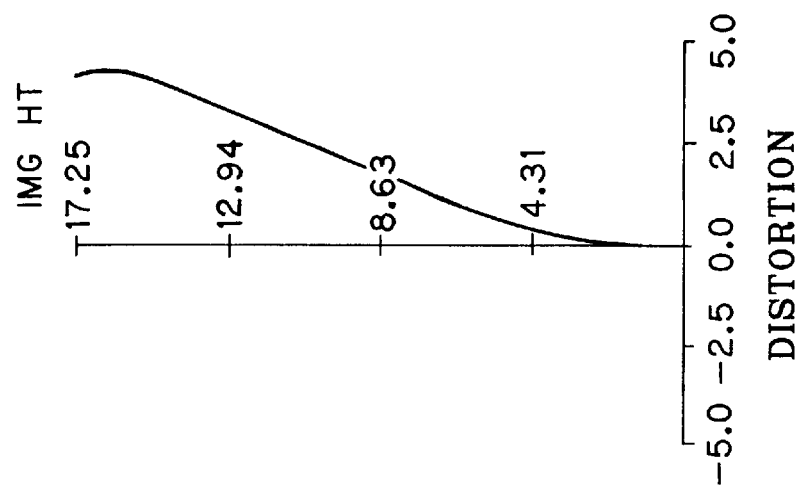
FIG. 6A  FIG. 6B  FIG. 6C
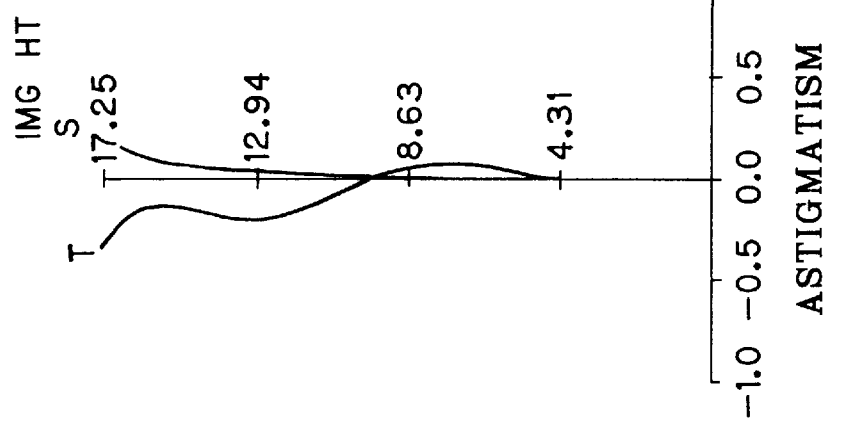
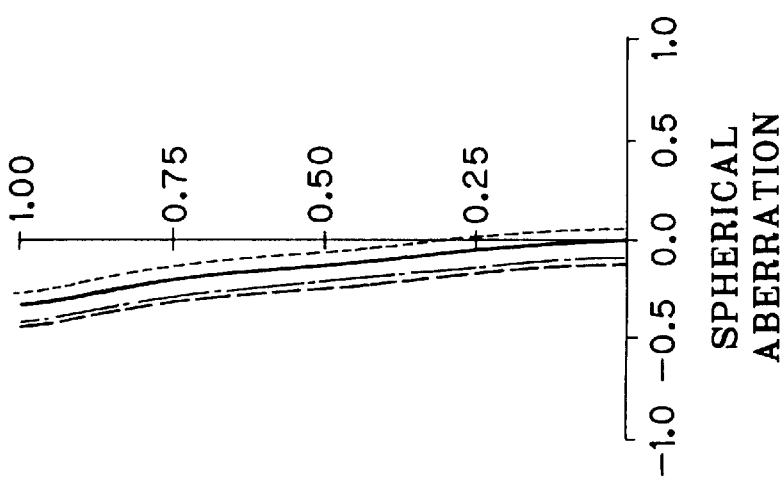

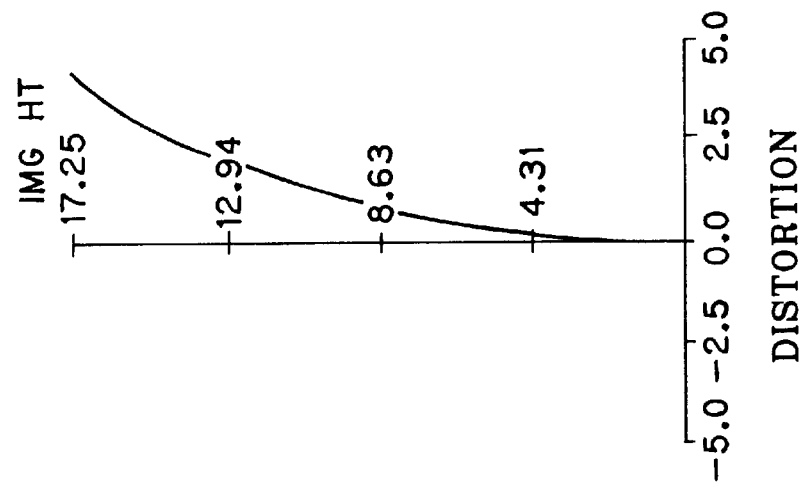
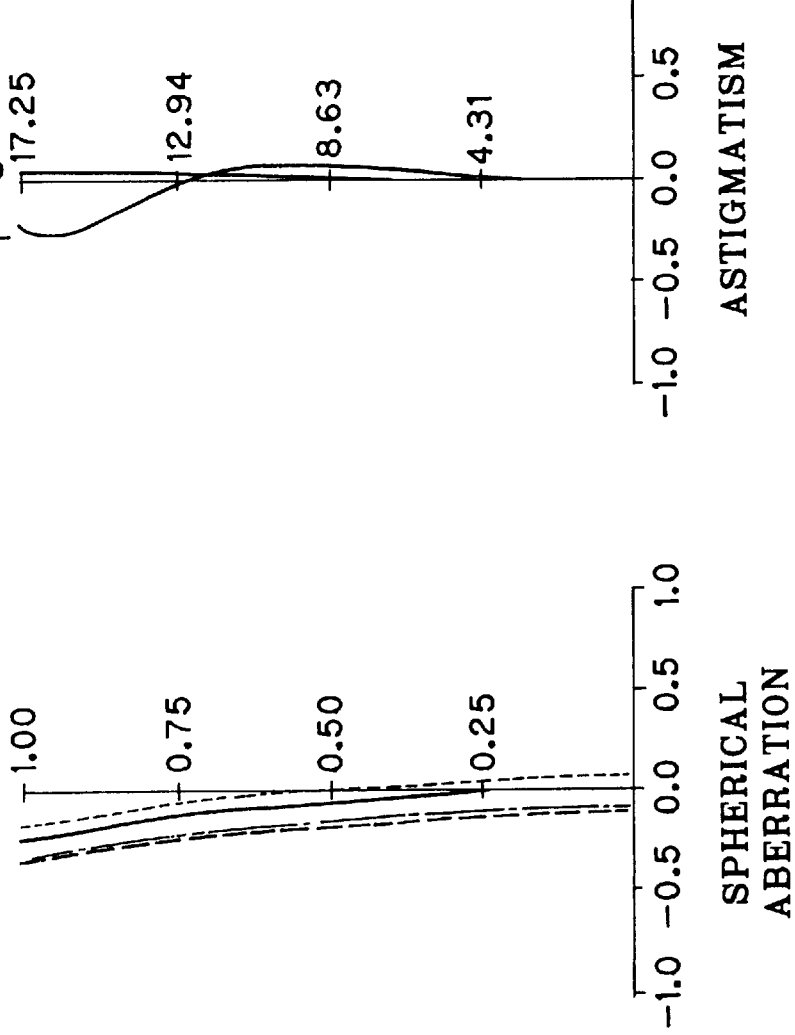
FIG. 10A  FIG. 10B  FIG. 10C

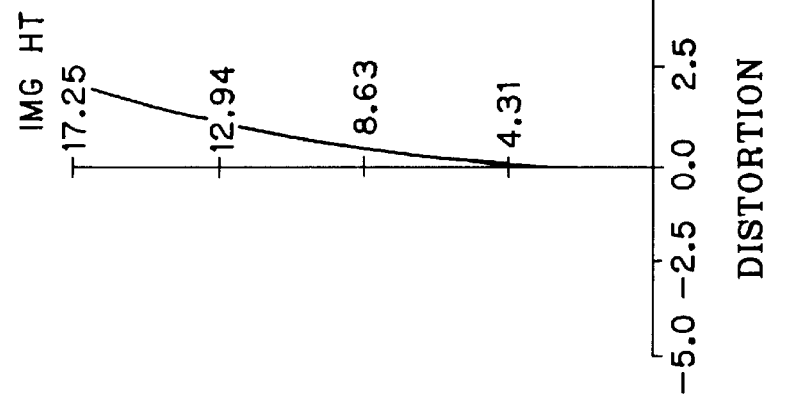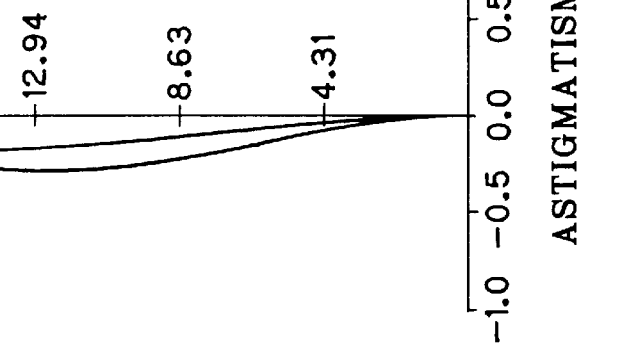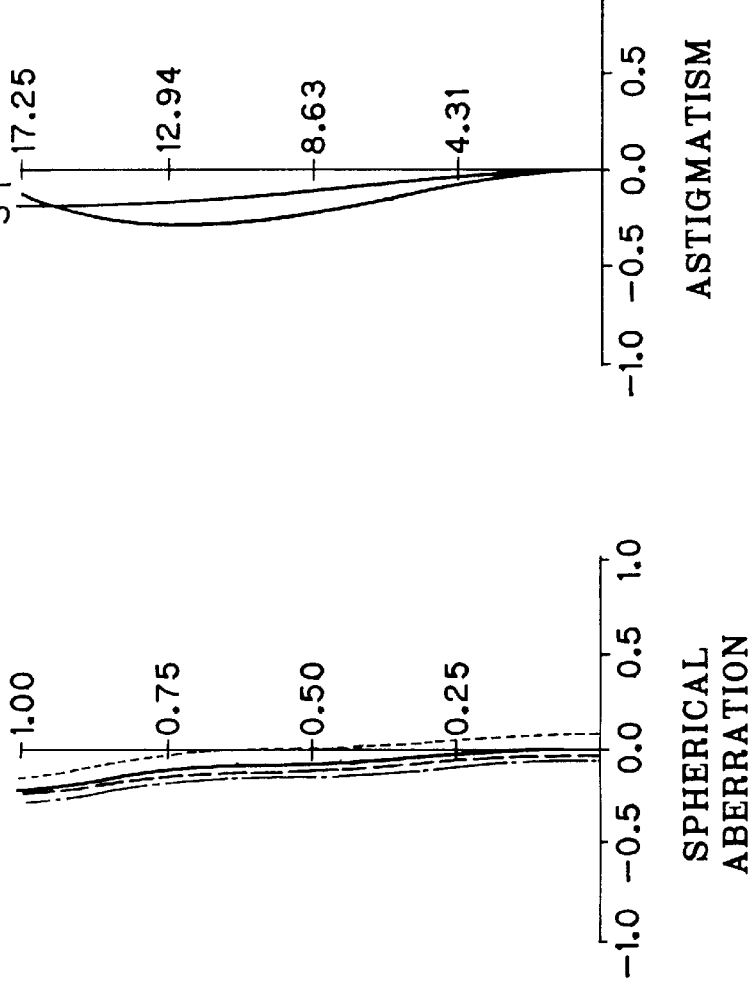

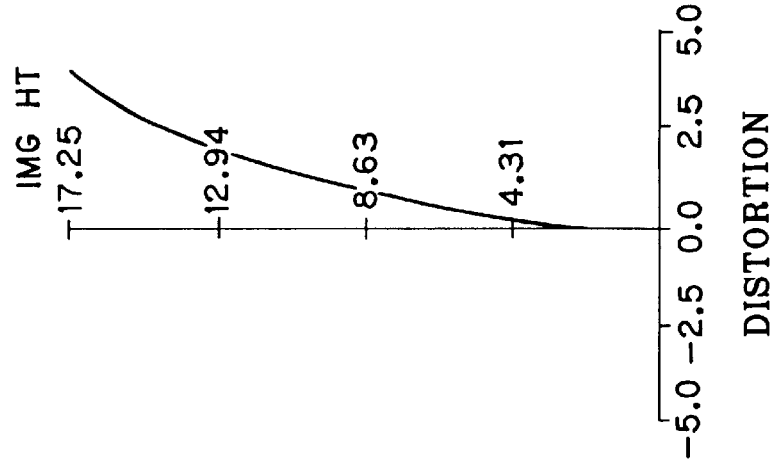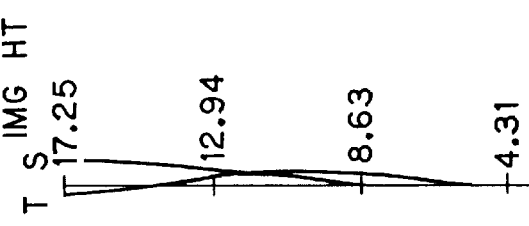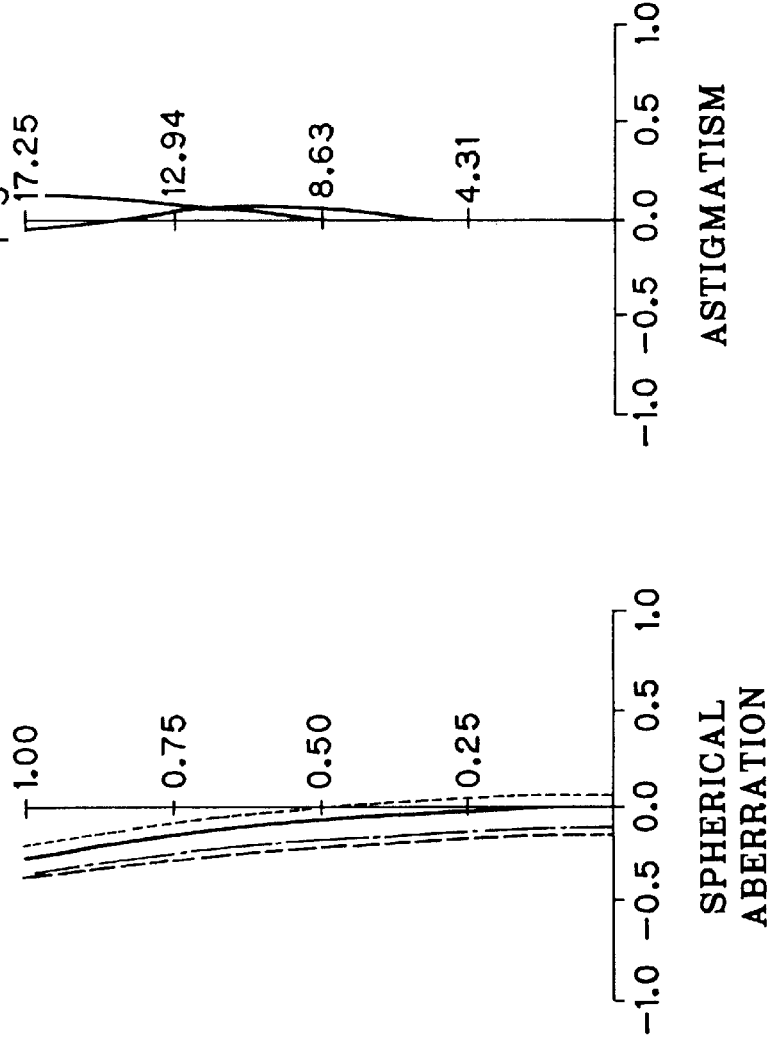

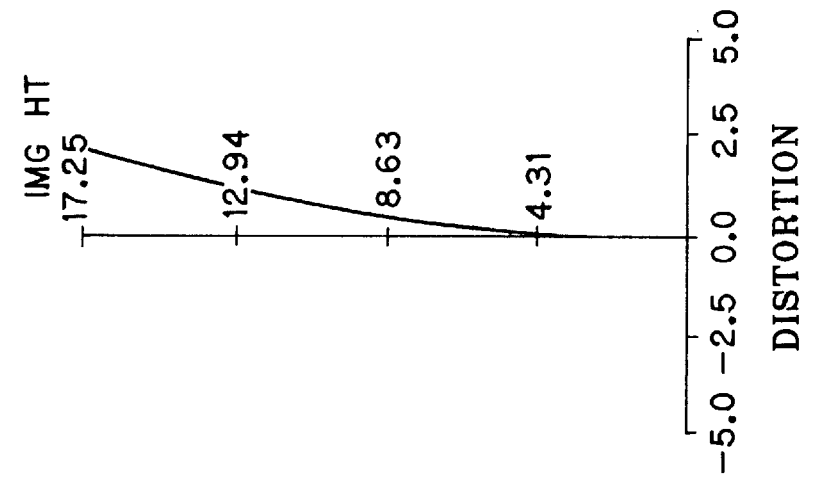
FIG. 15A  FIG. 15B  FIG. 15
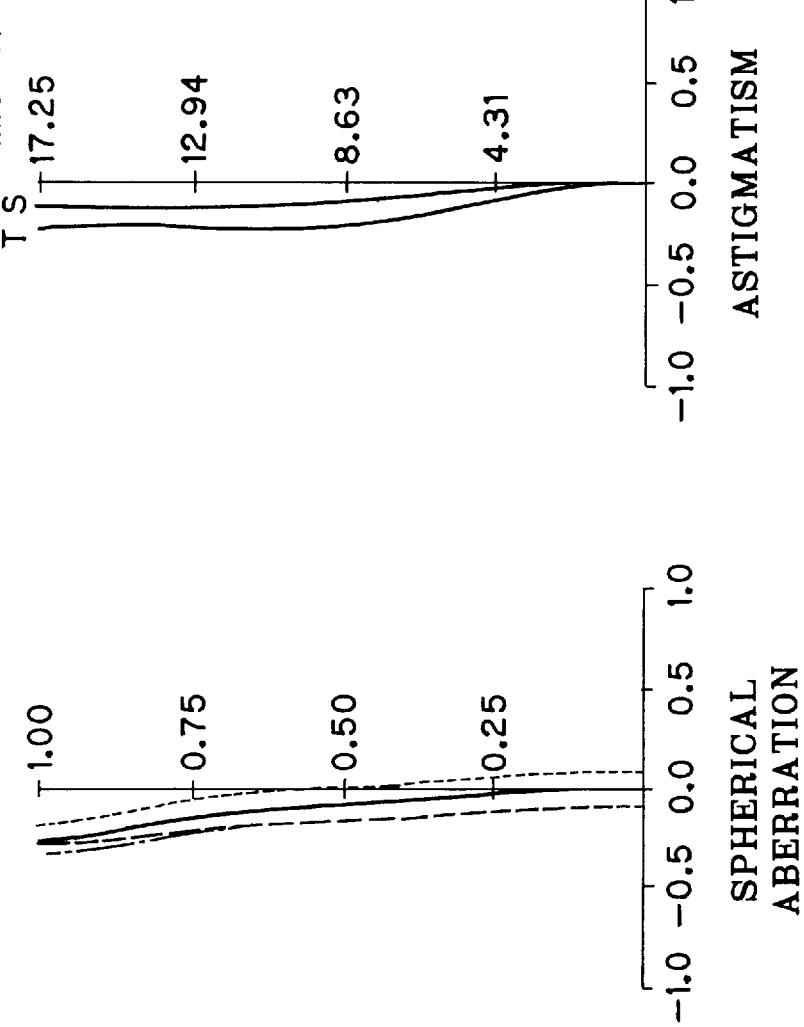

ZOOM LENS

BACKGROUND OF THE INVENTION

1. Field of the Invention

The present invention relates to a zoom lens that is small in size and suitable for a camera with a lens shutter or a video camera.

2. Background Arts

A camera with a lens shutter conventionally uses a zoom lens consisting of a front lens group having a positive power and a rear lens group having a negative power. As an example of small size zoom lens consisting of two lens groups, JPA 3-158815 discloses a zoom lens whose front lens group consists of two lens elements and whose rear lens group consists of a single lens element. In this zoom lens, the first and second lenses of the front lens group are spaced from each other by a relatively long distance in order to balance various aberrations well.

Indeed the zoom lens of the prior art uses merely three lens elements, but the larger spacing between the two lenses of the front lens group makes the total length of the zoom lens relatively large even in its retracted or collapsed position. Moreover, as the spacing between the two lens of the front lens group increases, the first lens must have a larger effective aperture and thus a larger diameter. As a result, also the diameter of the zoom lens of the prior art is relatively large.

OBJECT OF THE INVENTION

In view of the foregoing, a prime object of the present invention is to provide a zoom lens that consists of a small number of lens elements and is small in size.

DETAILED DESCRIPTION OF THE INVENTION

To achieve the above object, the present invention provides a zoom lens of a front lens group having a positive power and a rear lens group having a negative power, wherein the front lens group consists of a first lens having negative power and a second lens having a positive power. The first lens has at least one aspherical surface, and is spaced from the second lens by an air gap D2, wherein the zoom lens satisfies the following condition:

$$0 < D2/Fw < 0.1 \quad (1)$$

wherein D2 is the air gap between the first and second lenses, and Fw is a total focal length of the zoom lens at a wide-angle terminal.

Above the upper limit of the condition (1), spherical aberration would be too large to correct. Also, the air gap between the first and second lenses would be as large as conventional, and the effective aperture of the first lens would be as large as conventional. Below the lower limit of the condition (1), it is impossible to provide an air gap between the first and second lenses.

To balance various aberrations well, the one aspherical surface of the first lens of the zoom lens of the present invention preferably satisfies the following condition:

$$0.5 < |(C_{as} - C)/(N-1)/\Phi_{G1}| < 10 \quad (2)$$

wherein C is a radius of curvature of a base surface of the aspherical surface, N is an index of refraction of a medium forming the first lens, $\Phi_{G1}$ is a power of refraction of the first lens, and $C_{as}$ is a local radius of curvature at a height Y relative to an optical axis, wherein $0.7\ Y_{max} < Y < 1.0\ Y_{max}$, and $Y_{max}$ is a maximum effective aperture of the first lens.

It is to be noted that the local radius of curvature $C_{as}$ at the height Y relative to the optical axis may be calculated according to the following equation:

$$C_{as} = D2^2 X(Y)/D2Y^2$$

wherein X(Y) represents the surface contour of the aspherical surface, and X is an amount of displacement from the base surface in the direction of the optical axis.

Above the upper limit of the condition (2), coma aberration would be over-compensated, while astigmatism and spherical aberration would be worsen. Below the lower limit of the condition (2), coma aberration would be too large to compensate.

BRIEF DESCRIPTION OF THE DRAWINGS

The present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein:

FIGS. 2A, 2B and 2C are diagrams showing aberration curves of the zoom lens according to Example 1 at the wide-angle terminal;

FIGS. 3A, 3B and 3C are diagrams showing aberration curves of the zoom lens according to Example 1 at a middle focal length;

FIGS. 6A, 6B and 6C are diagrams showing aberration curves of the zoom lens according to Example 2 at the wide-angle terminal;

FIGS. 10A, 10B and 10C are diagrams showing aberration curves of the zoom lens according to Example 3 at the wide-angle terminal;

FIGS. 11A, 11B and 11C are diagrams showing aberration curves of the zoom lens according to Example 3 at a middle focal length;

FIGS. 14A, 14B and 14C are diagrams showing aberration curves of the zoom lens according to Example 4 at the wide-angle terminal;

FIGS. 15A, 15B and 15C are diagrams showing aberration curves of the zoom lens according to Example 4 at a middle focal length;

In FIGS. 1, 5, 9, 13, 17, 21, 25, the arrows indicate the directions of movements of front and rear lens groups of the respective zoom lenses when zooming to the wide angle terminal.

Figure 1:
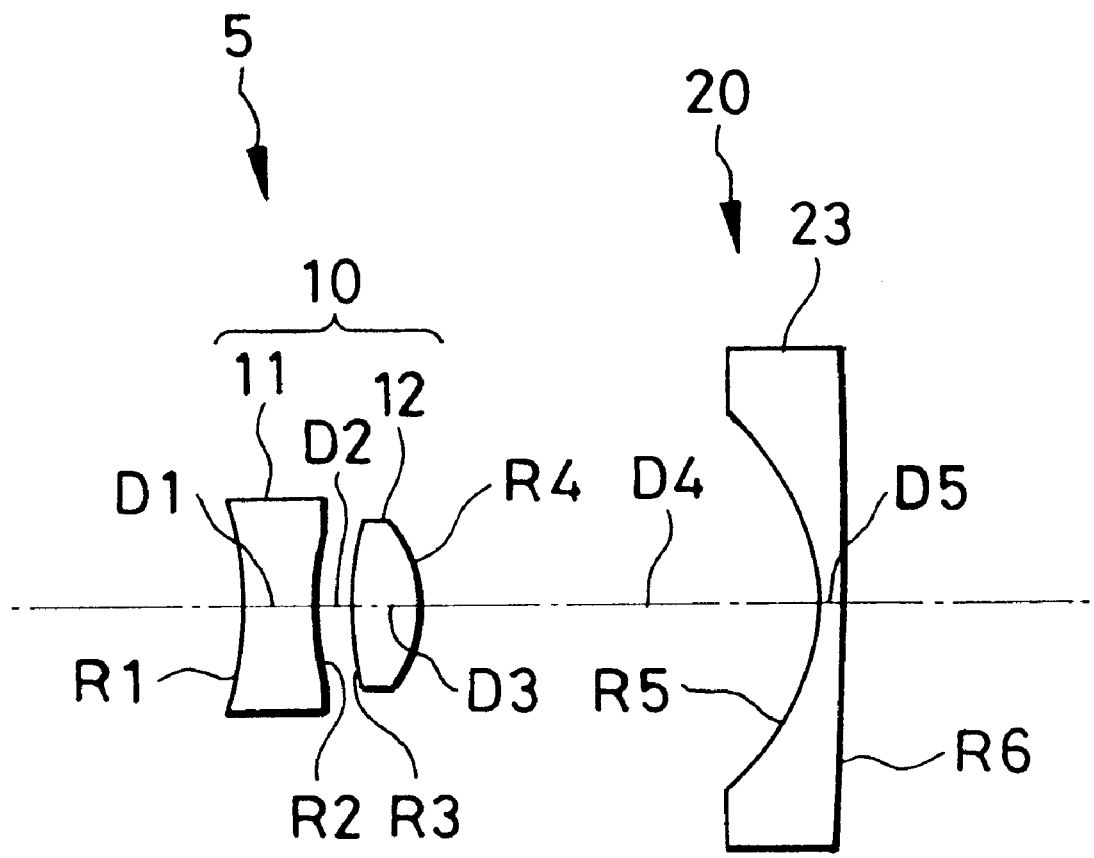
FIG. 1 is a schematic diagram showing a zoom lens according to Example 1 of the present invention, at a wide-angle terminal.
Figures 4A, 4B:
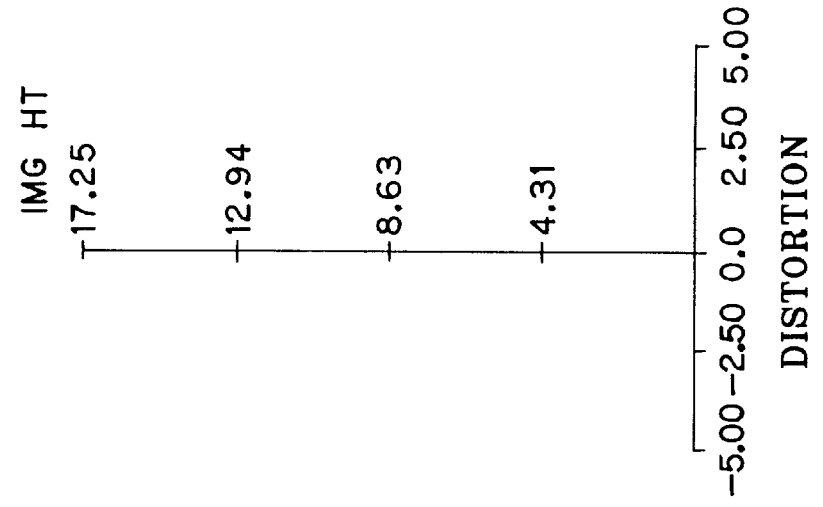
FIGS. 4A, 4B and 4C are diagrams showing aberration curves of the zoom lens according to Example 1 at a telephoto terminal.
Figure 4C:
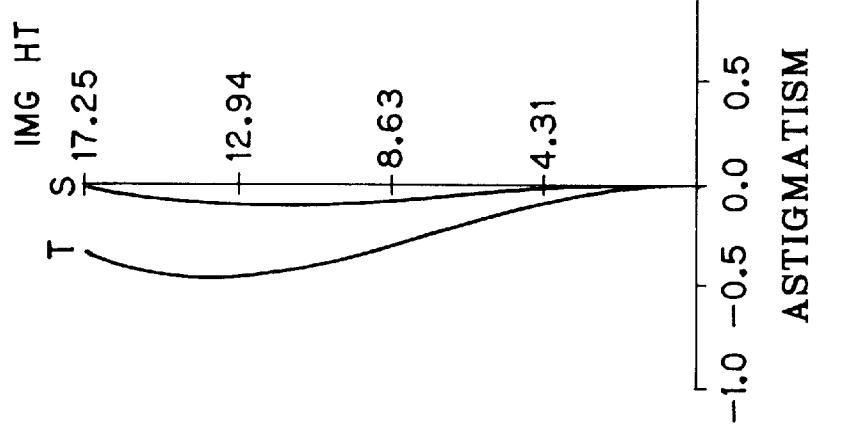

In the drawings, the curves S and T represent astigmatisms in the sagittal image surface and the tangential image surface respectively. The curves C, d, F, g represent spherical aberrations relative to the C-rays (656.3 nm), the d-rays (587.6 nm), the F-rays (486.1 nm) and the g-rays (435.8 nm).

DETAILED DESCRIPTION OF THE PREFERRED EMBODIMENT

EXAMPLE 1

The zoom lens 5 of the first Example of the present invention, as shown in FIG. 1, is composed of a front lens group 10 with a positive power, and a rear lens group 20 with a negative power, arranged in this order from the object side. The front and rear lens groups 10 and 20 are moved relative to each other along an optical axis for zooming. The front lens group 10 includes a first lens 11 of a negative power and a second lens 12 of a positive power, arranged in this order from the object side. The rear lens group 20 consists of a third lens 23 of a negative power. Object side surfaces R1 and R3 and image side surfaces R2 and R4 of the first and second lenses 11 and 12 are aspherical.

Numerical values of the first Example will be described below.

In the following numerical values of any Examples, R is the radius of curvature of the respective surfaces of the lens elements 11, 12 and 23, i is the surface number in the order from the object side, D is the spacing between two adjacent surfaces, N is the refractive index, and v is the Abbe number.

EXAMPLE 1

| i | R (mm) | D (mm) | N | v |
|---|---|---|---|---|
| 1 | −17.0045 (aspherical) | 3.26454 | 1.747509 | 37.2611 |
| 2 | 76.7339 (aspherical) | 1.32593 | | |
| 3 | 23.8927 (aspherical) | 3 | 1.487000 | 70.4 |
| 4 | −6.99216 (aspherical) | variable | | |
| 5 | −11.8156 | 1 | 1.620000 | 60.3 |
| 6 | −280.601 | | | |

The aspherical surfaces satisfy the following definition:

$$X = (Y^2/R)/[1+\sqrt{\{1-(1+K)\cdot(Y^2/R^2)\}}] + aY^2 + bY^6 + cY^8 + dY^{10} \quad (3)$$

wherein X is the displacement from the base surface in the axial direction, Y is the height relative to the optical axis in the perpendicular direction to the optical axis, K is the conical constant, R is the radius of curvature, a, b, c and d are the coefficients of the aspherical surfaces. It is possible to use another definition on the aspherical surfaces in place of the above definition (3) without interring the inventive effect.

Aspherical coefficients of the first Example are as follows:

| i | 1 | 2 | 3 | 4 |
|---|---|---|---|---|
| K | 2 | 10.219621 | −17.66172 | −0.13992 |
| a | −1.637320E−04 | 3.945130E−04 | 2.224290E−04 | −5.948580E−05 |
| b | 1.032190E−05 | 5.300960E−05 | 4.085390E−05 | 1.050960E−05 |
| c | −1.702140E−07 | −8.482370E−07 | 3.390040E−07 | −4.891900E−07 |
| d | −1.964640E−09 | 1.462760E−07 | 1.358250E−07 | 1.342110E−07 |

The total focal length F and the f-number of the zoom lens 5 of the first Example are designed to vary within the following ranges:

F: 24.00 to 34.00 to 45.12
f-number: 5.77 to 8.17 to 10.85

In correspondence with the variation of the focal length F, the distance D4 between the front lens group 10 and the rear lens group 20 varies as follows:

D4: 18.1643 to 10.9392 to 13.6239

In the first Example, the image side aspherical surface R2 of the first lens 11 satisfies the condition (1):

$$0.5 < |(C_{as}-C)/(N-1)/\Phi_{G1}| < 10$$

wherein C is a radius of curvature of a base surface, N is an index of refraction of a medium forming the first lens, $\Phi_{G1}$ is a power of refraction of the first lens, and $C_{as}$ is a local radius of curvature at a height Y relative to an optical axis, wherein $0.7\ Y_{max} < Y < 1.0 Y_{max}$, and $Y_{max}$ is a maximum effective aperture of the first lens.

With regard to the image side aspherical surface R2 of the first lens 11, the value $|(C_{as}-C)/(N-1)/\Phi_{G1}|$ varies with the value Y in the range of $0.7 Y_{max} < Y < 1.0 Y_{max}$ in the following manner.

|  | $|(C_{as} - C)/(N - 1)/\Phi_{G1}|$ |
| --- | --- |
| 0.7 $Y_{max}$ | 1.26651 |
| 0.8 $Y_{max}$ | 2.19331 |
| 0.9 $Y_{max}$ | 3.82621 |
| 1.0 $Y_{max}$ | 6.73237 |

In the first Example, the distance D2 between the first and second lenses 11 and 12, and the total focal length Fw of the zoom lens 5 at its wide-angle terminal are:

D2=1.32593, Fw=24.00.

D2/Fw=1.32593/24.00≈0.05524

Accordingly, the first Example satisfies the condition (1) for the first characteristic value of the invention: 0<D2/Fw<0.1.

Aberration curves of the first Example at the wide-angle terminal (F=24.00), at the middle focal length (F=34.00) and at the telephoto terminal (F=45.12) are shown in FIGS. 2A, 2B and 2C, FIGS. 3A, 3B and 3C and FIGS. 4A, 4B and 4C, respectively.

EXAMPLE 2

Figure 5:
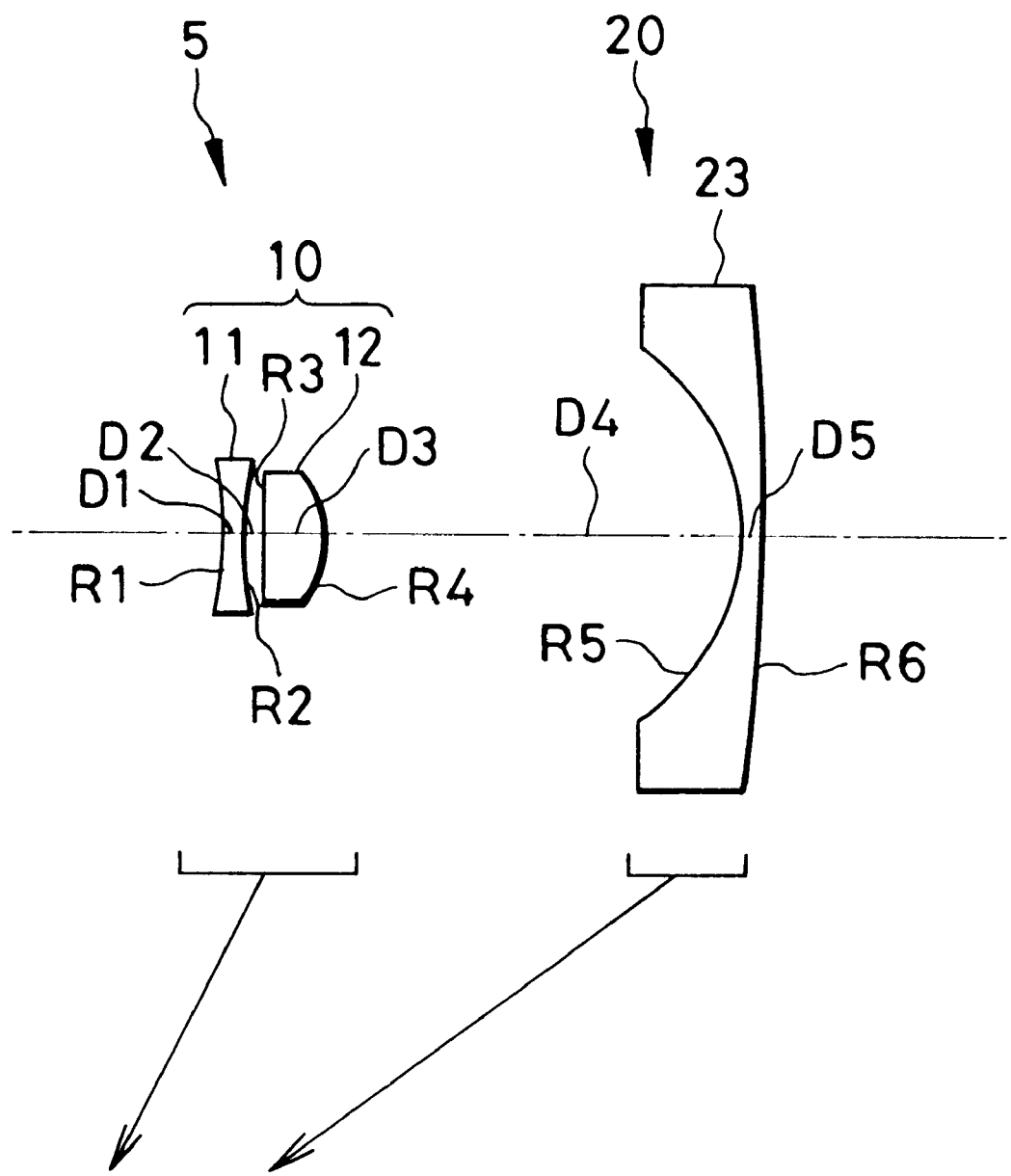
FIG. 5 is a schematic diagram showing a zoom lens according to Example 2 of the present invention, at a wide-angle terminal.
Figure 7C:
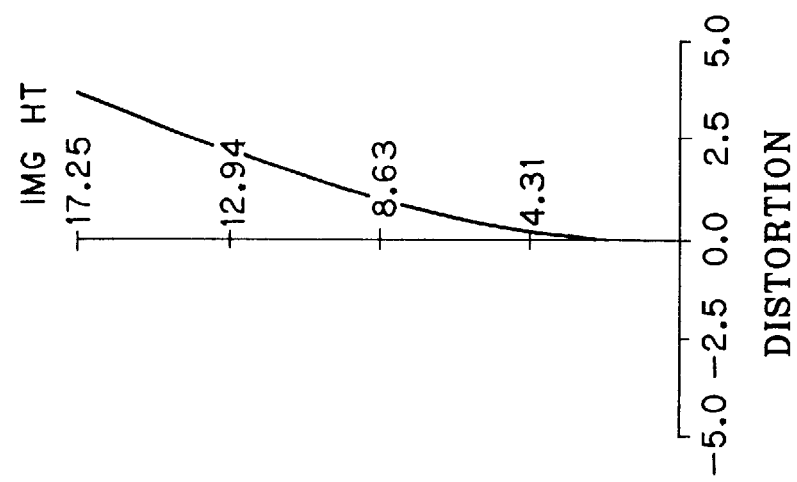
FIGS. 7A, 7B and 7C are diagrams showing aberration curves of the zoom lens according to Example 2 at a middle focal length.
Figure 7B:
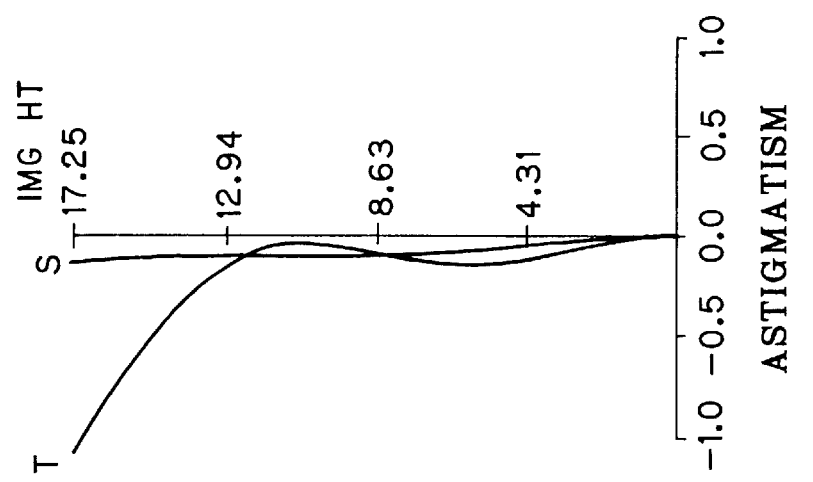
Figure 7A:
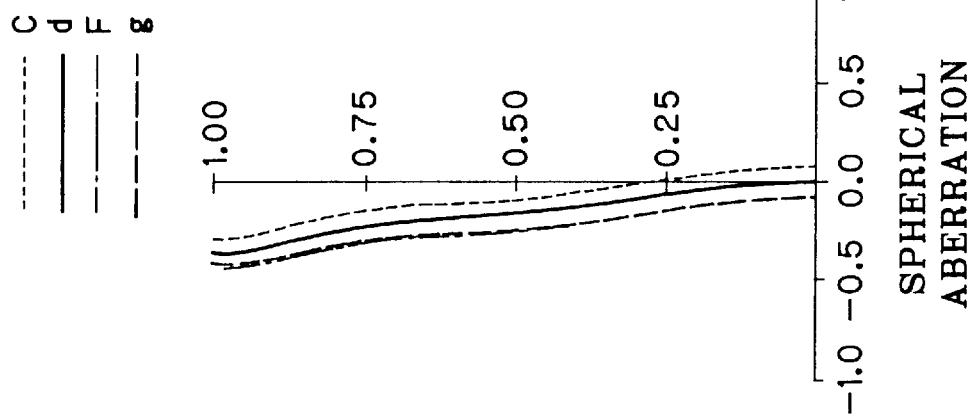
Figure 8C:
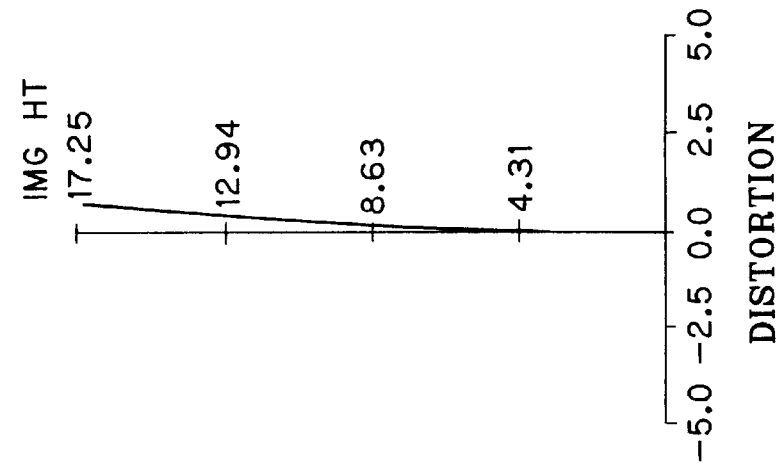
FIGS. 8A, 8B and 8C are diagrams showing aberration curves of the zoom lens according to Example 2 at a telephoto terminal.
Figure 8B:
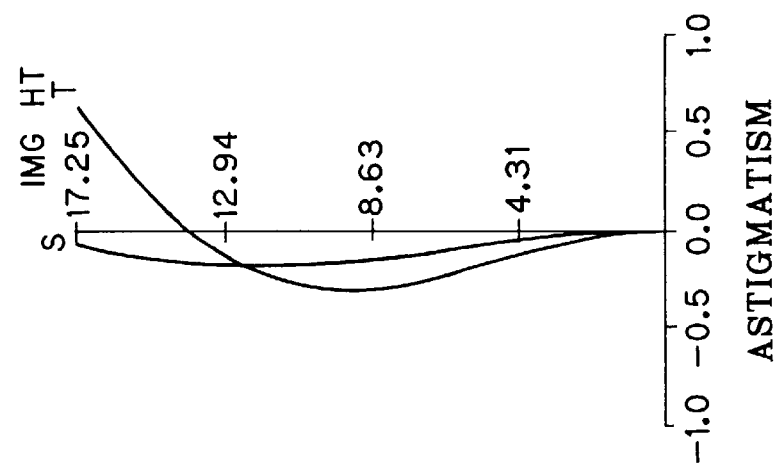
Figure 8A:
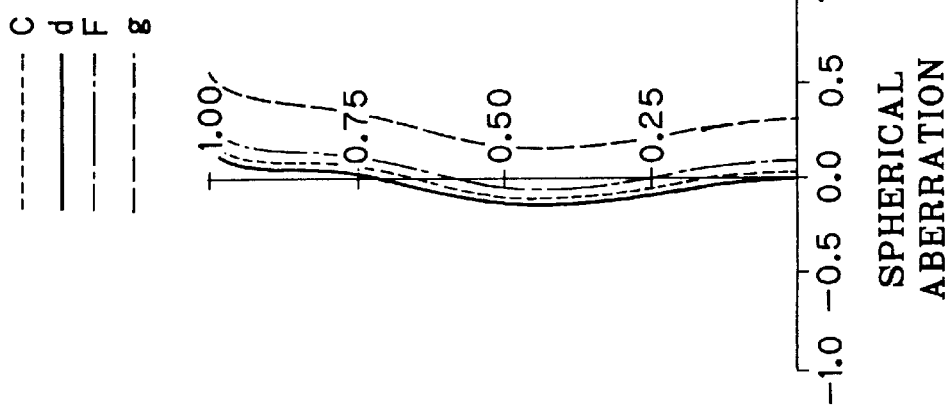

The composition of the zoom lens 5 of the second Example of the present invention, as shown in FIG. 5, is fundamentally equal to that of the first Example, as shown by the same reference numbers as used in FIG. 1. In the second Example, all surfaces R1 to R6 of first to third lenses 11, 12 and 23 are aspherical.

Numerical values and aspherical coefficients of the second Example are set forth below. In any of the following Examples, any aspherical surface satisfies the above definition (3).

EXAMPLE 2

| 1 | R (mm) | D (mm) | N | ν |
| --- | --- | --- | --- | --- |
| 1 | −13.6495 (aspherical) | 1.10013 | 1.734826 | 36.9615 |
| 2 | 1621.7 (aspherical) | 0.79621 |  |  |
| 3 | 87.2737 (aspherical) | 2.922 | 1.492609 | 67.0644 |
| 4 | −6.04327 (aspherical) | variable |  |  |
| 5 | −13.3418 (aspherical) | 1 | 1.553850 | 64.3311 |
| 6 | −1907.72 (aspherical) |  |  |  |

| i | 1 | 2 | 3 |
| --- | --- | --- | --- |
| K | 1.794321 | −29.88028 | −20 |
| a | −3.460850E−04 | 1.423570E−04 | −6.738340E−04 |
| b | 5.677900E−05 | 9.800520E−05 | −7.002920E−06 |
| c | −6.502610E−07 | 2.916050E−06 | 8.824960E−06 |
| d | −8.760530E−08 | 3.357760E−08 | −4.543920E−07 |

EXAMPLE 2-continued

| i | 4 | 5 | 6 |
| --- | --- | --- | --- |
| K | 0.219663 | −0.296758 | −2064.763 |
| a | −2.868550E−04 | −1.069860E−04 | −7.517050E−05 |
| b | −6.996320E−06 | −2.359670E−06 | 8.452880E−07 |
| c | −8.839490E−07 | 6.522560E−08 | −4.224640E−09 |
| d | 7.858180E−09 | −4.937130E−10 | 5.073310E−12 |

As for the second Example, the total focal length F, the f-number of the zoom lens 5 and the distance D4 between the front lens group 10 and the rear lens group 20 vary as follows:

F: 26.39 to 34.19 to 49.60 f-number: 6.35 to 8.22 to 11.93

D4: 19.9535 to 15.5227 to 10.8598

In the second Example, the image side aspherical surface R2 of the first lens 11 satisfies the condition (2): $0.5 < |(C_{as}-C)/(N-1)/\Phi_{G1}| < 10$ in the range of $0.7 Y_{max} < Y < 1.0 Y_{max}$. With regard to the image side aspherical surface R2 of the first lens 11, the value $|(C_{as}-C)/(N-1)/\Phi_{G1}|$ varies with the value Y in the range of $0.7 Y_{max} < Y < 1.0 Y_{max}$ in the following manner.

|  | $|(C_{as} - C)/(N - 1)/\Phi_{G1}|$ |
| --- | --- |
| 0.7 $Y_{max}$ | 0.94687 |
| 0.8 $Y_{max}$ | 1.6606 |
| 0.9 $Y_{max}$ | 2.78114 |
| 1.0 $Y_{max}$ | 4.4887 |

In the second Example, the distance D2 between the first and second lenses 11 and 12, and the total focal length Fw of the zoom lens 5 at the wide-angle terminal are:

D2=0.79621, Fw=26.39

D2/Fw=0.79621/26.39≈0.03017

Accordingly, the second Example satisfies the condition (1).

Aberration curves of the second Example at the wide-angle terminal (F=26.39), at the middle focal length (F=34.19) and at the telephoto terminal (F=49.60) are shown in FIGS. 6A, 6B and 6C, FIGS. 7A, 7B and 7C and FIGS. 8A, 8B and 8C, respectively.

EXAMPLE 3

Figure 9:
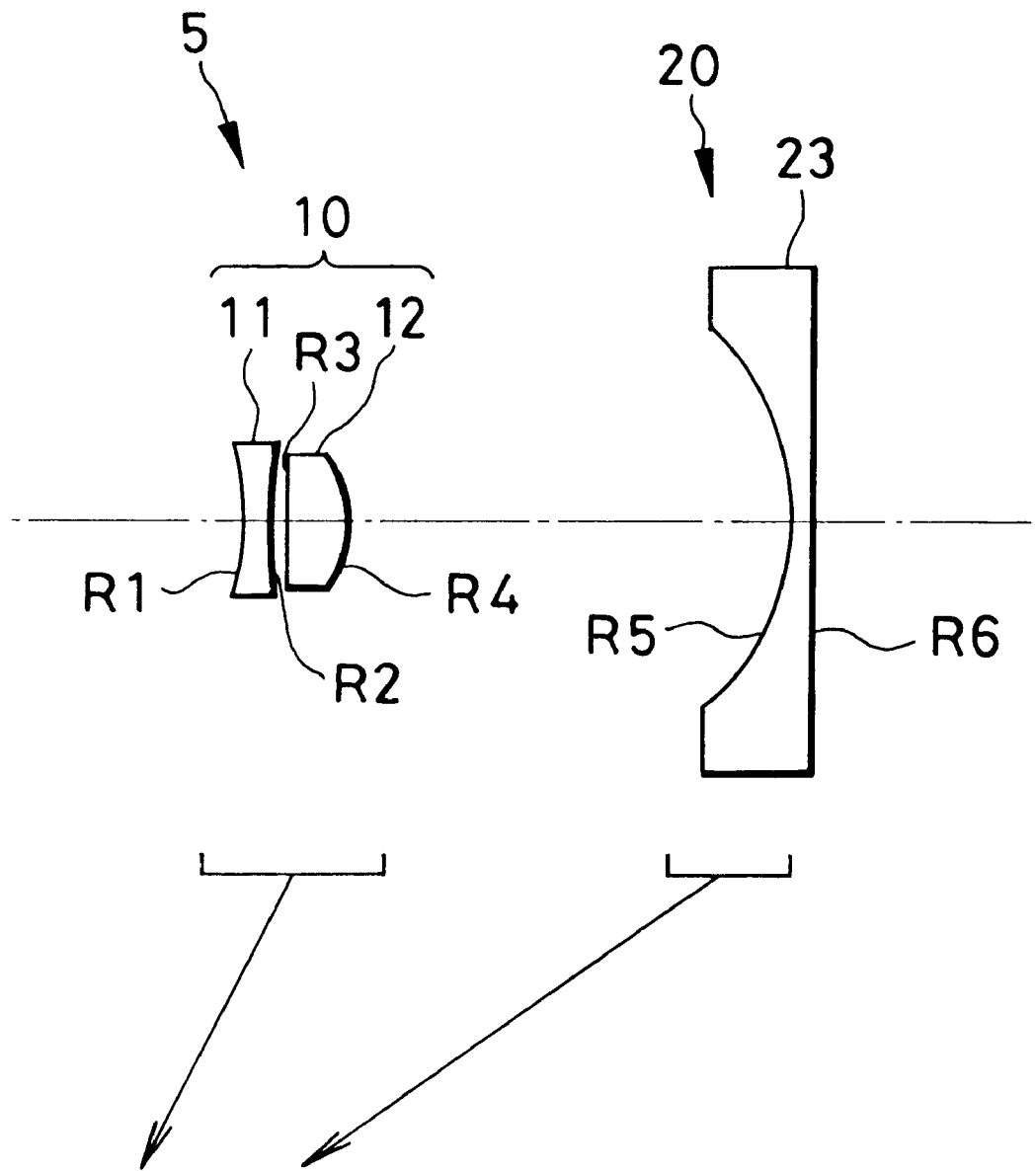
FIG. 9 is a schematic diagram showing a zoom lens according to Example 3 of the present invention, at a wide-angle terminal.
Figure 12C:
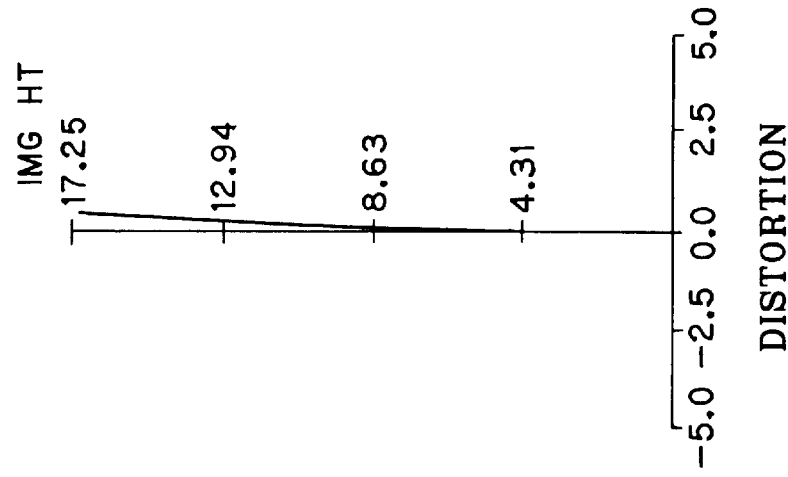
FIGS. 12A, 12B and 12C are diagrams showing aberration curves of the zoom lens according to Example 3 at a telephoto terminal.
Figure 12B:
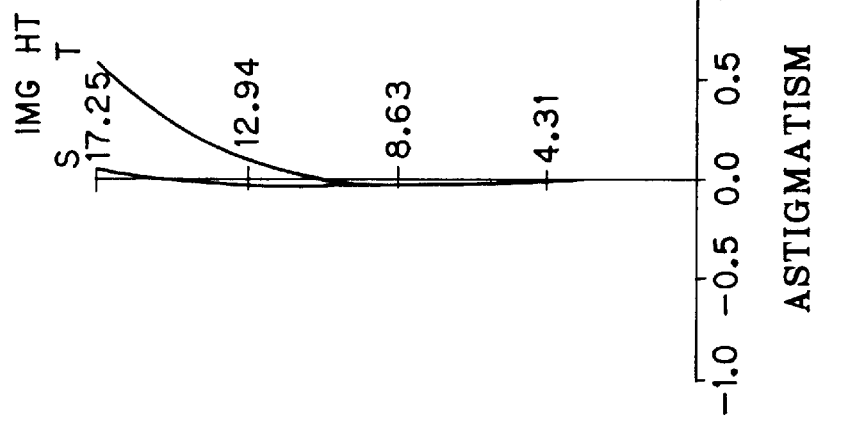
Figure 12A:
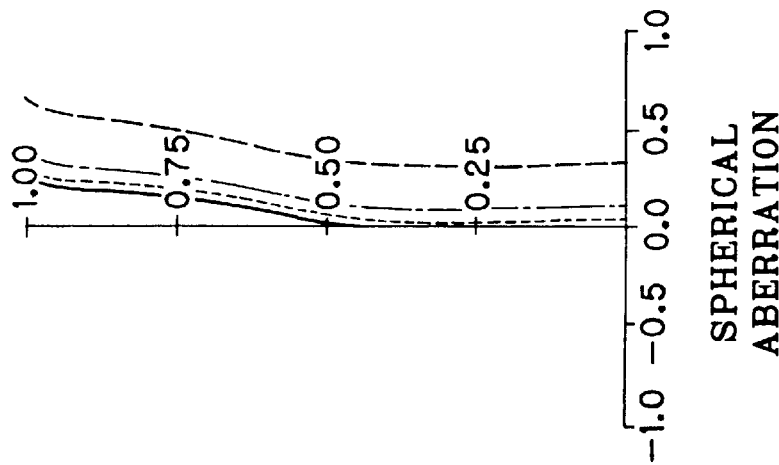

The composition of the zoom lens 5 of the third Example of the present invention, as shown in FIG. 9, is fundamentally equal to that of the first Example, as shown by the same reference numbers as used in FIG. 1. In the third Example, all surfaces R1 to R4 of first to second lenses 11 and 12 and an image side surface R6 of a third lens 23 are aspherical. From the third example, the reference numerals D1 to D5 designating distances between the lens surfaces R1 to R6 are omitted from the drawings for clarity sake.

Numerical values and aspherical coefficients of the third Example will be described below.

EXAMPLE 3

| i | R (mm) | D (mm) | N | ν |
|---|---|---|---|---|
| 1 | −16.4866 (aspherical) | 1.52301 | 1.776099 | 33.859 |
| 2 | 1000 (aspherical) | 0.995683 | | |
| 3 | 63.3212 (aspherical) | 3 | 1.5168 | 64.2 |
| 4 | −6.92786 (aspherical) | variable | | |
| 5 | −12.5532 | 1 | 1.642041 | 60.3 |
| 6 | −71.5476 (aspherical) | | | |

| i | 1 | 2 | 3 |
|---|---|---|---|
| K | 3.403018 | −30 | −20 |
| a | −5.812270E−04 | −2.666420E−04 | −4.362150E−04 |
| b | 4.009680E−05 | 7.391780E−05 | 2.996020E−05 |
| c | −4.193460E−07 | 1.064830E−06 | 2.925480E−06 |
| d | −2.825340E−08 | −9.456040E−09 | −1.247370E−07 |

| i | 4 | 6 |
|---|---|---|
| K | 0.045604 | −32.72678 |
| a | −1.745750E−04 | 1.124000E−05 |
| b | −6.874410E−06 | −4.776440E−08 |
| c | 8.372820E−07 | −7.166160E−10 |
| d | −4.249550E−08 | 3.409470E−12 |

As for the third Example, the total focal length F, the f-number of the zoom lens 5 and the distance D4 between the front lens group 10 and the rear lens group 20 vary as follows:

F: 26.00 to 36.40 to 48.88 f-number: 6.25 to 8.75 to 11.75

D4: 19.7362 to 14.2619 to 10.7677

In the third Example, the image side aspherical surface R2 of the first lens 11 satisfies the condition (2): $0.5 < |(C_{as}-C)/(N-1)/\Phi_{G1}| < 10$ in the range of $0.7Y_{max} < Y < 1.0Y_{max}$. With regard to the image side aspherical surface R2 of the first lens 11, the value $|(C_{as}-C)/(N-1)/\Phi_{G1}|$ varies with the value Y in the range of $0.7Y_{max} < Y < 1.0Y_{max}$ in the following manner.

| | $|(C_{as} - C)/(N - 1)/\Phi_{G1}|$ |
|---|---|
| 0.7 $Y_{max}$ | 1.00525 |
| 0.8 $Y_{max}$ | 1.88906 |
| 0.9 $Y_{max}$ | 3.25604 |
| 1.0 $Y_{max}$ | 5.26734 |

In the third Example, the characteristic value D2/Fw= 0.995683/26.00≈0.0383. Accordingly, the third Example satisfies the condition (1).

Aberration curves of the third Example at the wide-angle terminal (F=26.00), at the middle focal length (F=36.40) and at the telephoto terminal (F=48.88) are shown in FIGS. 10A, 10B and 10C, FIGS. 11A, 11B and 11C and FIGS. 12A, 12B and 12C, respectively.

EXAMPLE 4

Figure 13:
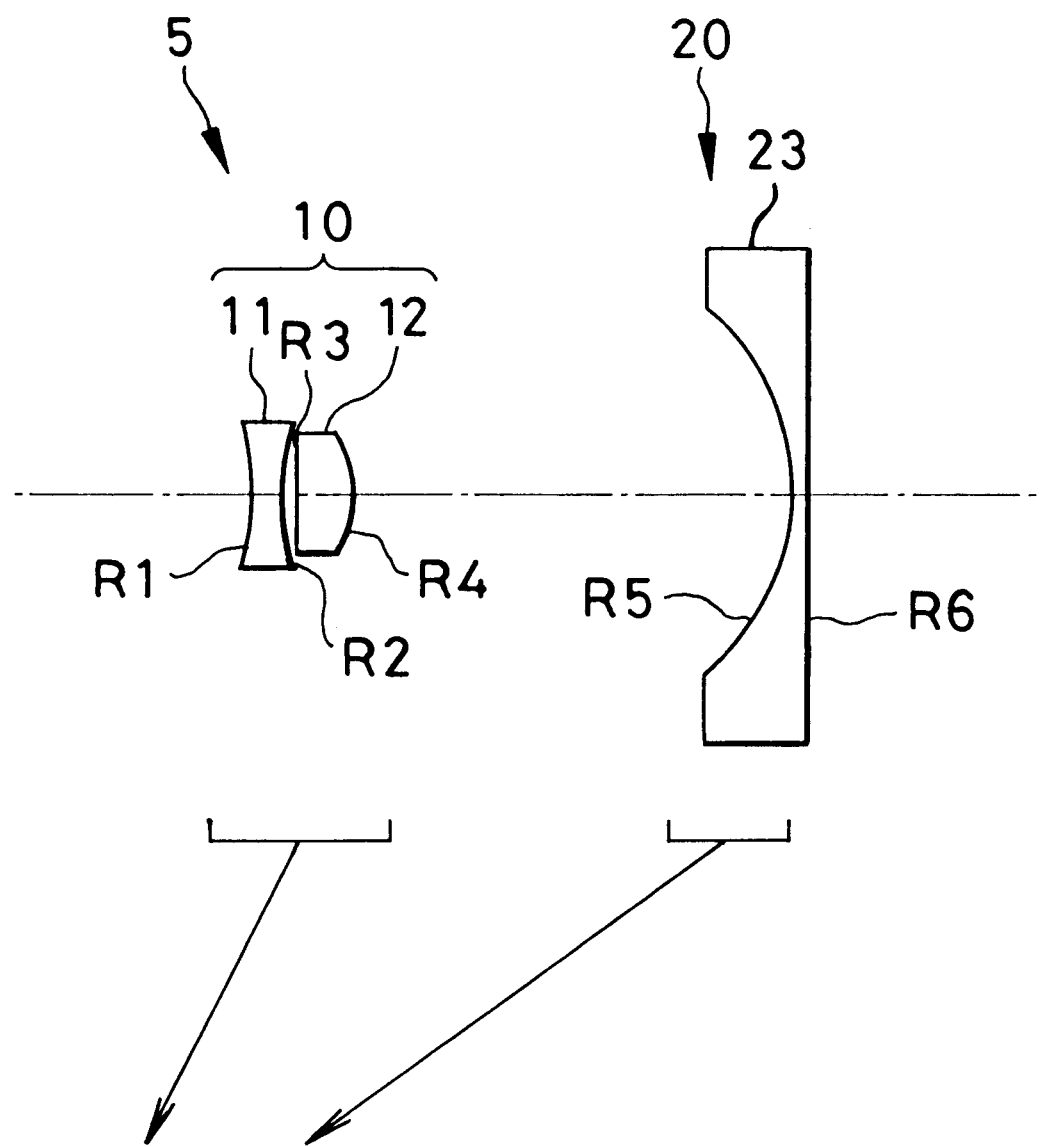
FIG. 13 is a schematic diagram showing a zoom lens according to Example 4 of the present invention, at a wide-angle terminal.
Figure 16C:
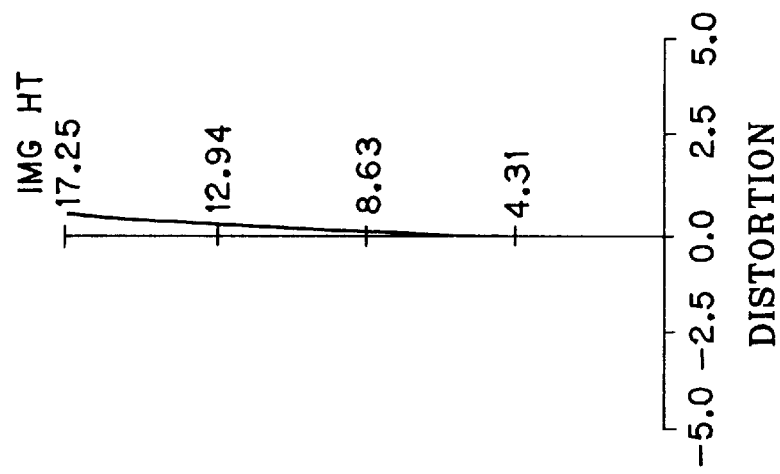
FIGS. 16A, 16B and 16C are diagrams showing aberration curves of the zoom lens according to Example 4 at a telephoto terminal.
Figure 16B:
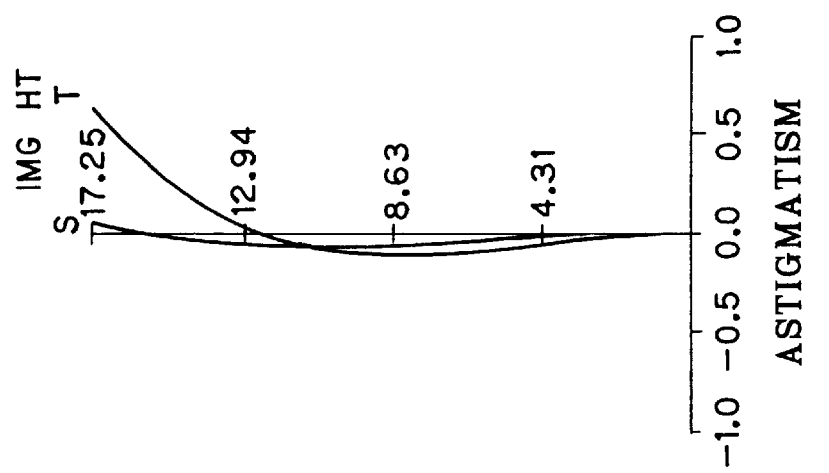
Figure 16A:
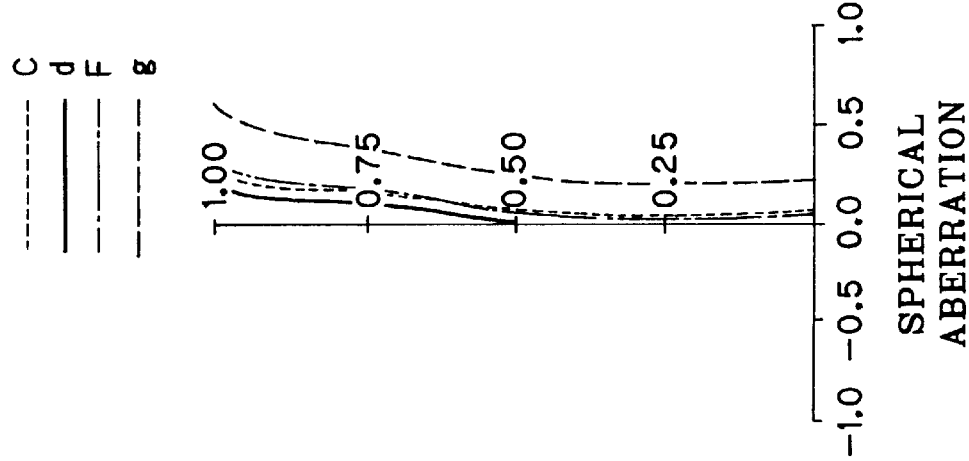

The composition of the zoom lens 5 of the fourth Example of the present invention, as shown in FIG. 13, is fundamentally equal to that of the first example, as shown by the same reference numbers as used in FIG. 1. In fourth Example, all surfaces R1 to R4 of first to second lenses 11 and 12 and an object side surface R5 of a third lens 23 are aspherical.

Numerical values and aspherical coefficients of the fourth Example are as set forth below.

EXAMPLE 4

| i | R (mm) | D (mm) | N | ν |
|---|---|---|---|---|
| 1 | −13.8628 (aspherical) | 1.79176 | 1.745816 | 40.5067 |
| 2 | 2644.19 (aspherical) | 0.637172 | | |
| 3 | 79.7756 (aspherical) | 3 | 1.487000 | 70.4 |
| 4 | −6.35765 (aspherical) | variable | | |
| 5 | −13.9 (aspherical) | 1 | 1.514065 | 67.6202 |
| 6 | −3428.52 | | | |

| i | 1 | 2 | 3 |
|---|---|---|---|
| K | 2 | −30 | −20 |
| a | −1.199810E−04 | 3.701540E−04 | −4.132980E−04 |
| b | 6.795730E−06 | 2.609930E−05 | −1.100600E−05 |
| c | 1.955710E−06 | 7.062610E−06 | 8.229290E−06 |
| d | −1.117460E−07 | −4.284410E−08 | −1.804600E−07 |

| i | 4 | 5 |
|---|---|---|
| K | 0.192031 | −1.032804 |
| a | −2.401940E−04 | −6.478060E−05 |
| b | −7.728600E−06 | −6.126400E−07 |
| c | −6.010100E−07 | 8.171070E−09 |
| d | 2.751090E−08 | −4.635400E−11 |

As for the fourth Example, the total focal length F, the f-number of the zoom lens 5 and the distance D4 between the front lens group 10 and the rear lens group 20 vary as follows:

F: 28.00 to 34.19 to 52.63 f-number: 6.73 to 9.42 to 12.66

D4: 22.5567 to 16.1664 to 12.0877

In the fourth Example, the image side aspherical surface R2 of the first lens 11 satisfies the condition (2): $0.5 < |(C_{as}-C)/(N-1)/\Phi_{G1}| < 10$ in the range of $0.7Y_{max} < Y < 1.0Y_{max}$. With regard to the image side aspherical surface R2 of the first lens 11, the value $|(C_{as}-C)/(N-1)/\Phi_{G1}|$ varies with the value Y in the range of $0.7Y_{max} < Y < 1.0Y_{max}$ in the following manner.

| | $|(C_{as} - C)/(N - 1)/\Phi_{G1}|$ |
|---|---|
| 0.7 $Y_{max}$ | 0.9462 |
| 0.8 $Y_{max}$ | 1.71678 |
| 0.9 $Y_{max}$ | 3.00341 |
| 1.0 $Y_{max}$ | 5.0599 |

In the fourth Example, the characteristic value D2/Fw= 0.637172/28.00≈0.023. Accordingly, the fourth Example satisfies the condition (1).

Aberration curves of the fourth Example at the wide-angle terminal (F=28.00), at the middle focal length (F=34.19) and at the telephoto terminal (F=52.63) are shown in FIGS. 14A, 14B and 14C, FIGS. 15A, 15B and 15C and FIGS. 16A, 16B and 16C, respectively.

EXAMPLE 5

Figure 17:
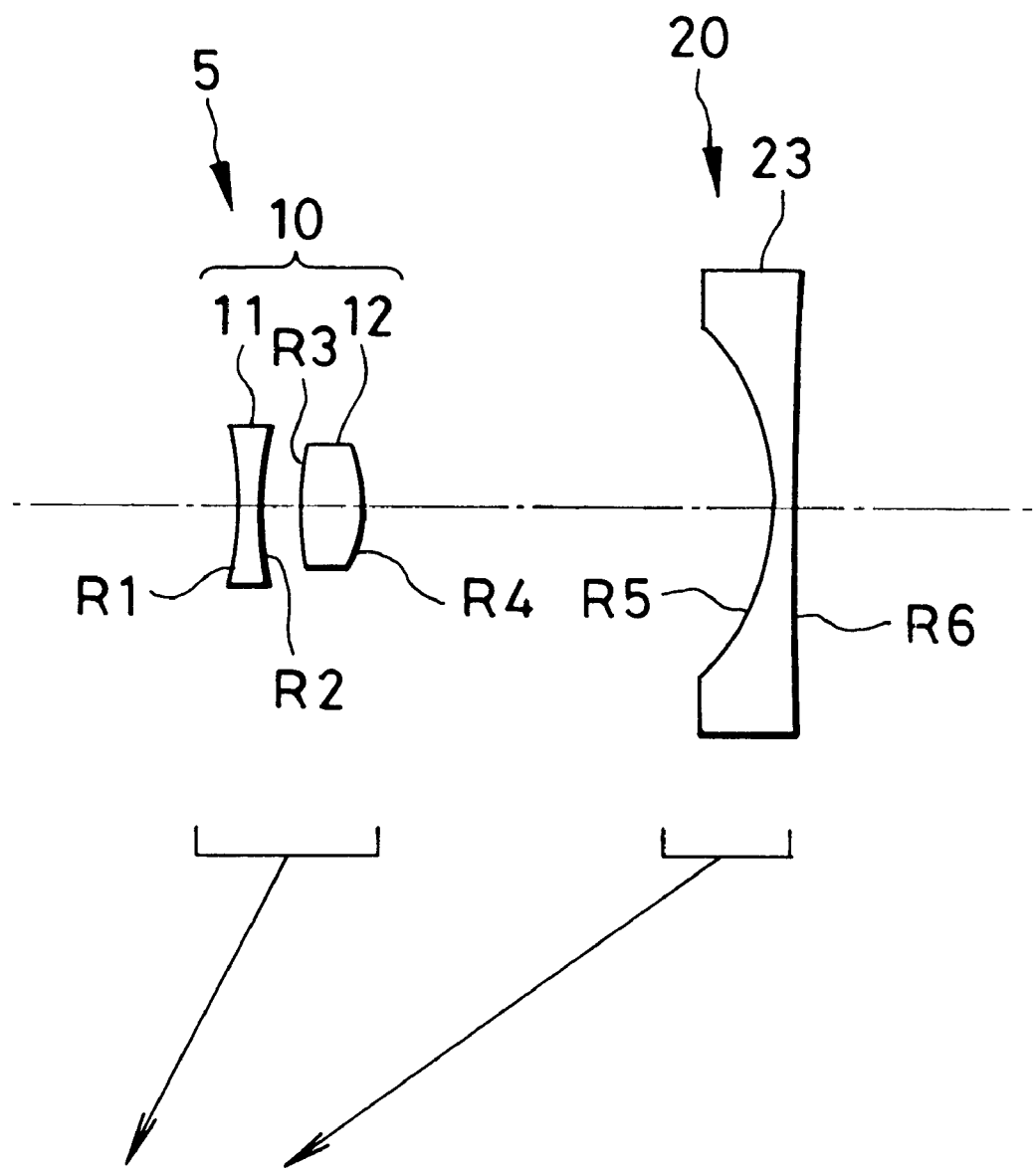
FIG. 17 is a schematic diagram showing a zoom lens according to Example 5 of the present invention, at a wide-angle terminal.
Figure 18C:
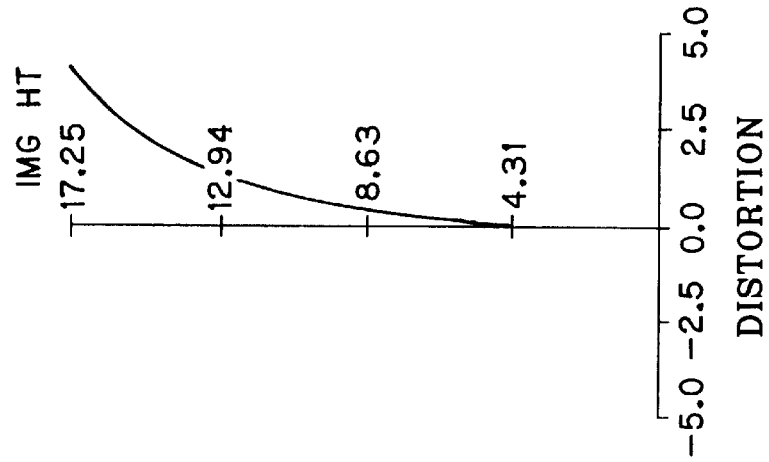
FIGS. 18A, 18B and 18C are diagrams showing aberration curves of the zoom lens according to Example 5 at the wide-angle terminal.
Figure 18B:
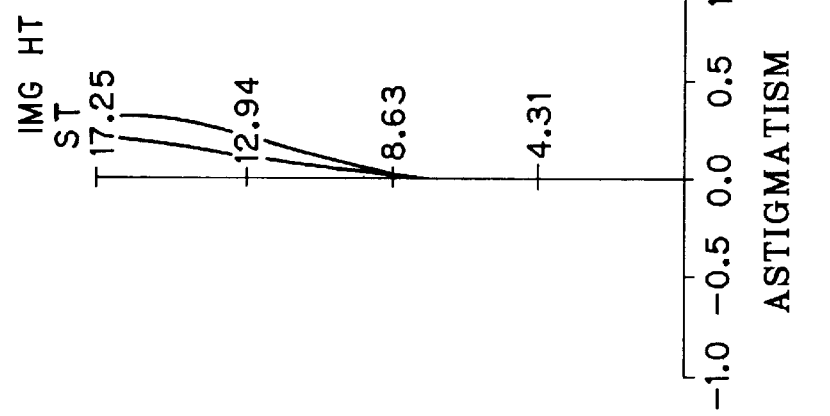
Figure 18A:
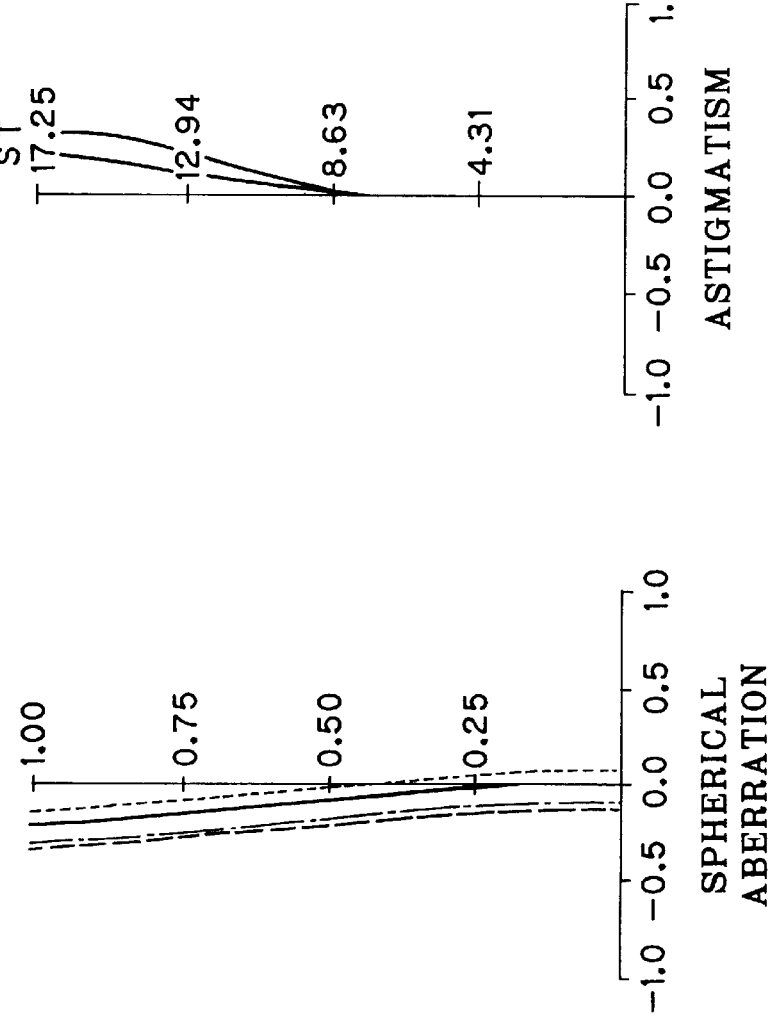
Figure 19C:
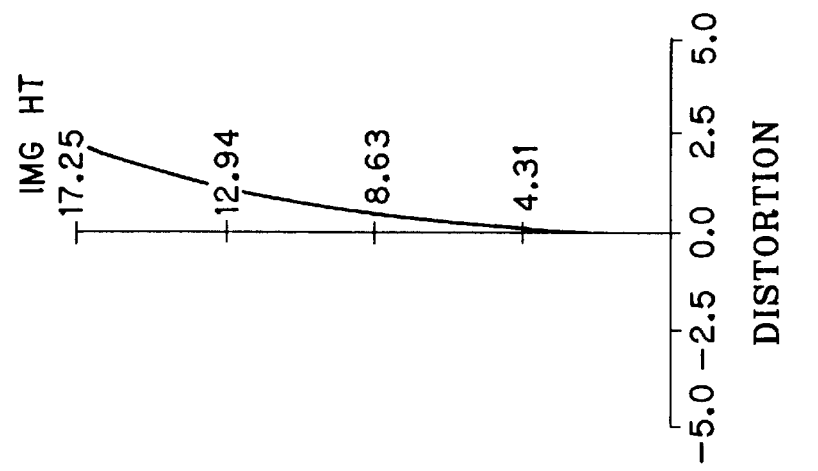
FIGS. 19A, 19B and 19C are diagrams showing aberration curves of the zoom lens according to Example 5 at a middle focal length.
Figure 19B:
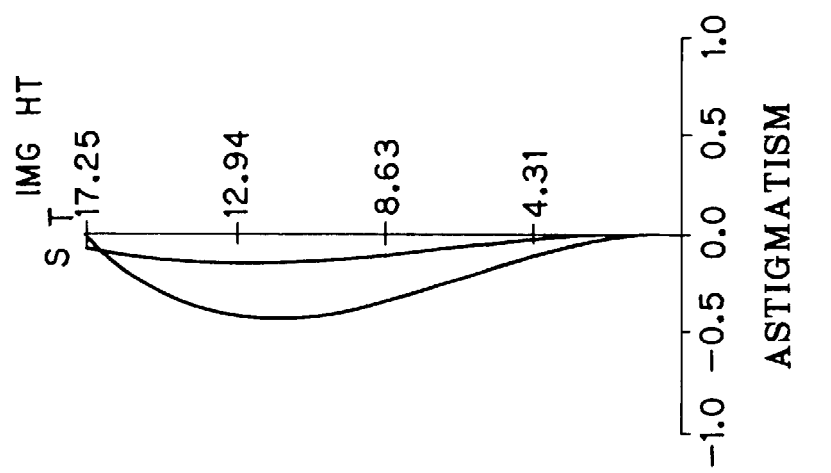
Figure 19A:
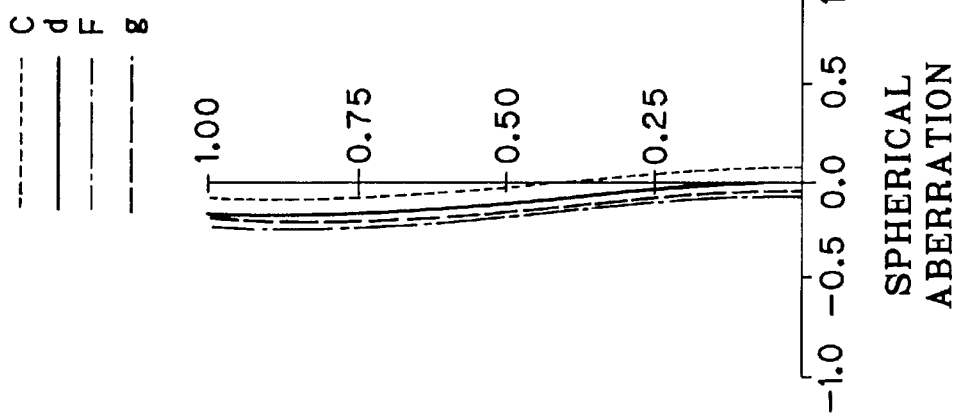
Figure 20C:
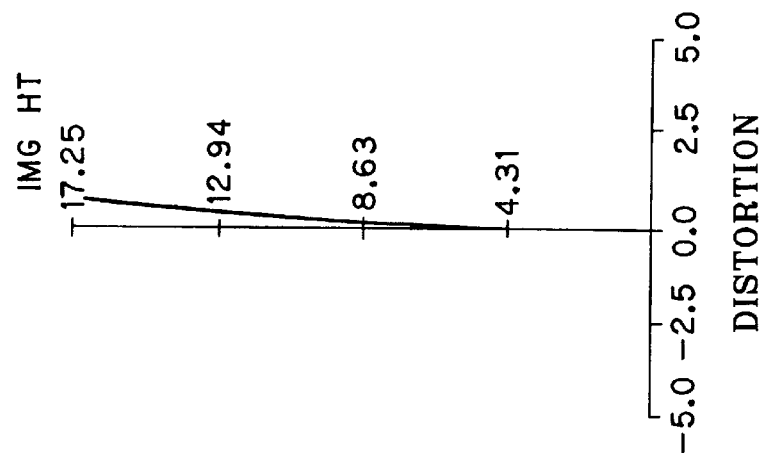
FIGS. 20A, 20B and 20C are diagrams showing aberration curves of the zoom lens according to Example 5 at a telephoto terminal.
Figure 20B:
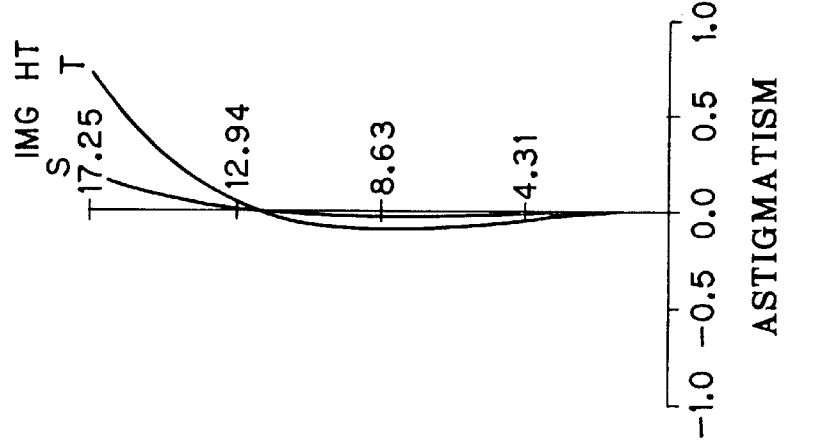
Figure 20A:
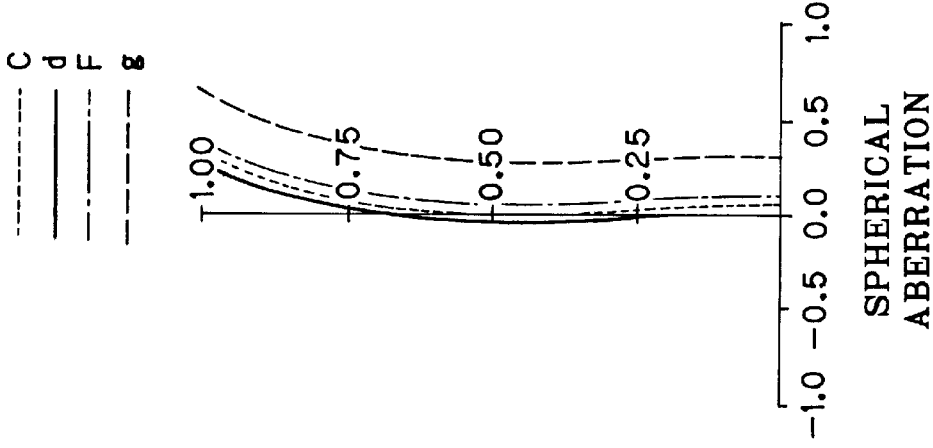

The composition of the zoom lens 5 of the fifth Example of the present invention, as shown in FIG. 17, is fundamentally equal to that of the first Example, as shown by the same reference numbers as used in FIG. 1. In the fifth Example, both surfaces R1 to R2 of a first lens 11 are aspherical.

Numerical values and aspherical coefficients of the fifth Example will be described below.

EXAMPLE 5

| i | R (mm) | D (mm) | N | ν |
|---|---|---|---|---|
| 1 | −50.2903 (aspherical) | 1.1 | 1.747898 | 36.5907 |
| 2 | 24.7752 (aspherical) | 2.13999 | | |
| 3 | 37.8499 | 3 | 1.488893 | 70.1878 |
| 4 | −7.44993 | variable | | |
| 5 | −13.8326 | 1 | 1.588121 | 62.0674 |
| 6 | 495.329 | | | |

| i | 1 | 2 |
|---|---|---|
| K | −0.492914 | −14.1429 |
| a | −9.673020E−04 | −4.167430E−04 |
| b | 2.088140E−05 | 3.567870E−05 |
| c | −9.425970E−07 | −2.053300E−06 |
| d | 3.639970E−08 | 1.287310E−07 |

As for the fifth Example, the total focal length F, the f-number of the zoom lens 5 and the distance D4 between the front lens group 10 and the rear lens group 20 vary as follows:

F: 28.00 to 34.19 to 52.63 f-number: 6.73 to 9.42 to 12.66

D4: 20.6029 to 15.4922 to 12.2319

In the fifth Example, the object side aspherical surface R1 of the first lens 11 satisfies the condition (2): $0.5<|(C_{as}-C)/(N-1)/\Phi_{G1}|<10$ in the range of $0.7Y_{max}<Y<1.0Y_{max}$. With regard to the object side aspherical surface R1 of the first lens 11, the value $|(C_{as}-C)/(N-1)/\Phi_{G1}|$ varies with the value Y in the range of $0.7Y_{max}<Y<1.0Y_{max}$ in the following manner.

| | $|(C_{as} - C)/(N - 1)/\Phi_{G1}|$ |
|---|---|
| $0.7\ Y_{max}$ | 0.948995 |
| $0.8\ Y_{max}$ | 1.128903 |
| $0.9\ Y_{max}$ | 1.222569 |
| $1.0\ Y_{max}$ | 1.095134 |

In the fifth Example, the characteristic value D2/Fw= 2.13999/28.00≈0.076. Accordingly, the fifth Example satisfies the condition (1).

Aberration curves of the fifth Example at the wide-angle terminal (F=28.00), at the middle focal length (F=34.19) and at the telephoto terminal (F=52.63) are shown in FIGS. 18A, 18B and 18C, FIGS. 19A, 19B and 19C and FIGS. 20A, 20B and 20C, respectively.

EXAMPLE 6

Figure 21:
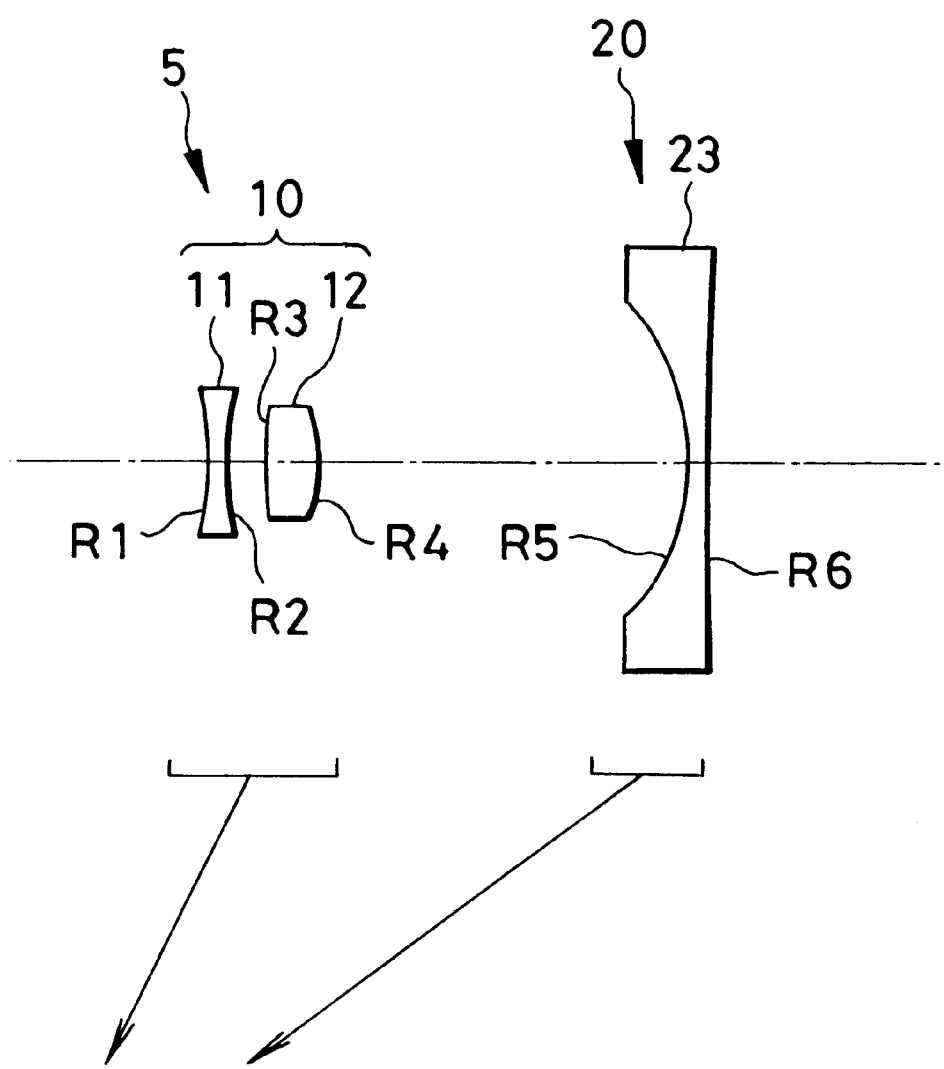
FIG. 21 is a schematic diagram showing a zoom lens according to Example 6 of the present invention, at a wide-angle terminal.
Figure 22C:
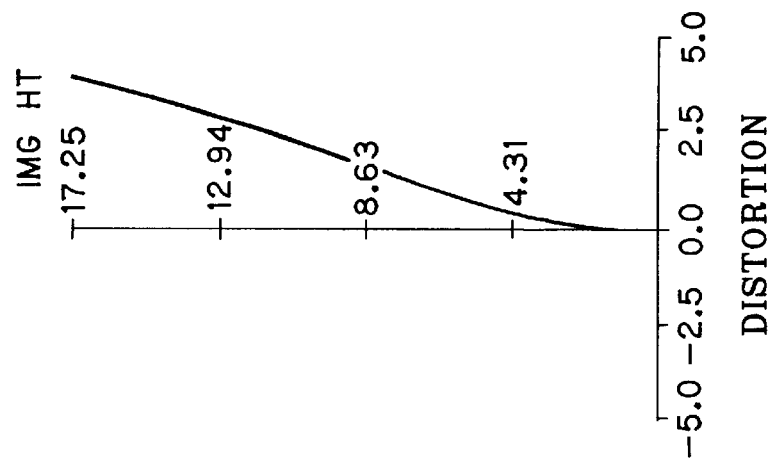
FIGS. 22A, 22B and 22C are diagrams showing aberration curves of the zoom lens according to Example 6 at the wide-angle terminal.
Figure 22B:
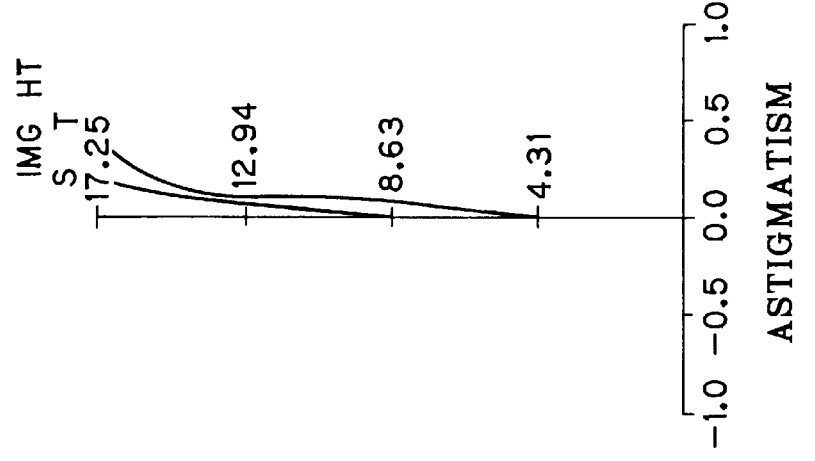
Figure 22A:
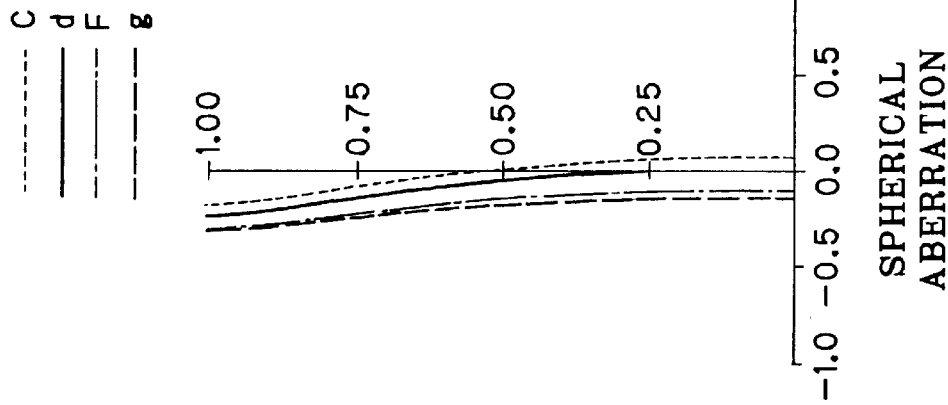
Figure 23C:
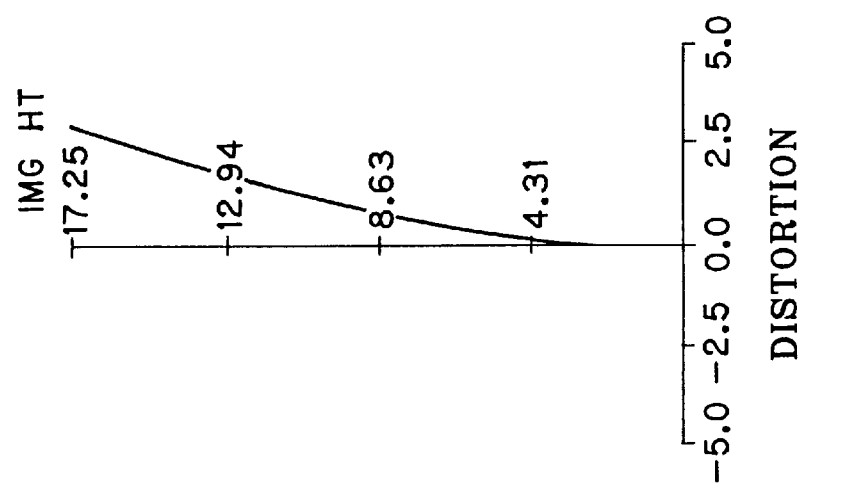
FIGS. 23A, 23B and 23C are diagrams showing aberration curves of the zoom lens according to Example 6 at a middle focal length.
Figure 23B:
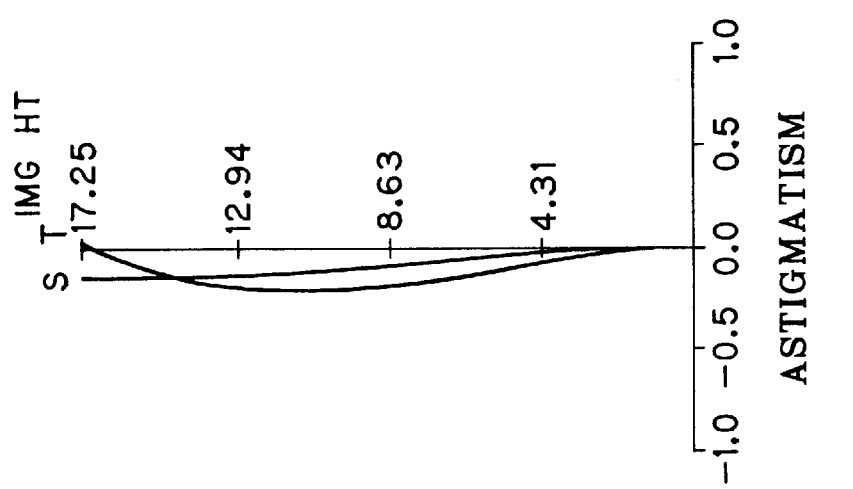
Figure 23A:
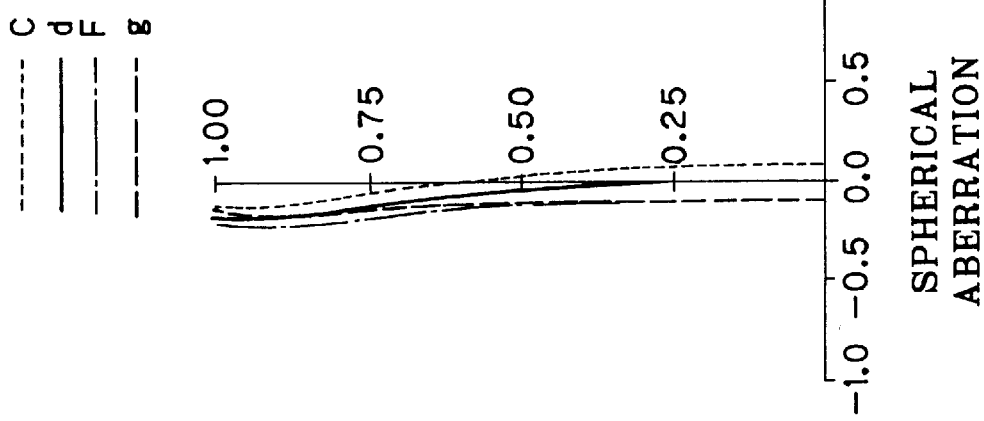
Figure 24A:
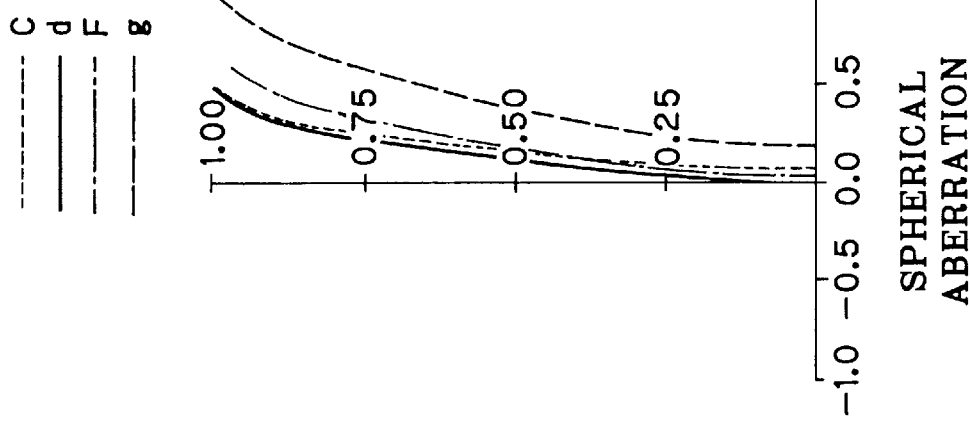
FIGS. 24A, 24B and 24C are diagrams showing aberration curves of the zoom lens according to Example 6, at a telephoto terminal.
Figure 24B:
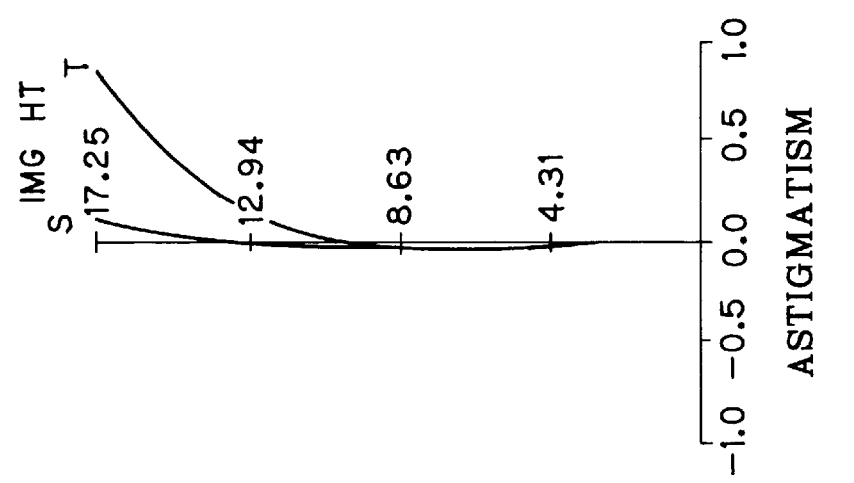
Figure 24C:
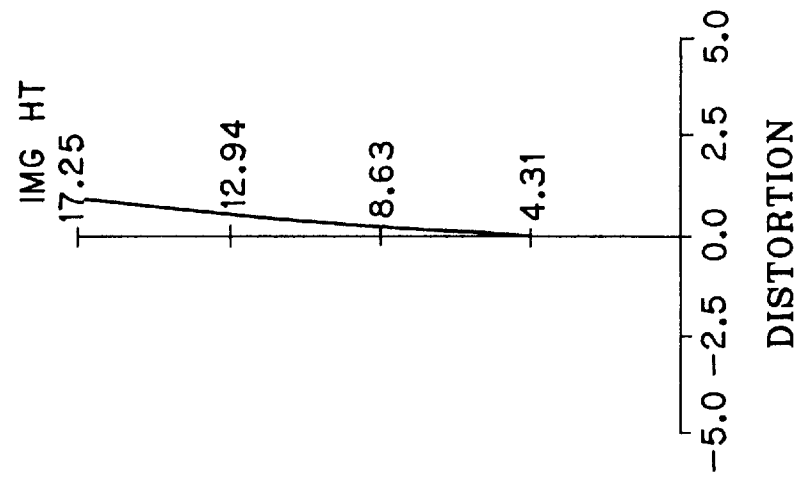

The composition of the zoom lens 5 of the sixth example of the present invention, as shown in FIG. 21, is fundamentally equal to that of the first Example, as shown by the same reference numbers as used in FIG. 1. In sixth example, respective object side surfaces R1, R3 and R5 of first to third lenses 11, 12 and 23 are aspherical.

Numerical values and aspherical coefficients of the sixth example be described below.

EXAMPLE 6

| i | R (mm) | D (mm) | N | ν |
|---|---|---|---|---|
| 1 | −20.6222 (aspherical) | 1.94774 | 1.749145 | 34.5966 |
| 2 | 61.8776 | 0.449494 | | |
| 3 | 47.4541 (aspherical) | 3 | 1.55994 | 60.8504 |
| 4 | −7.9449 | variable | | |
| 5 | −12.7133 (aspherical) | 1 | 1.487 | 70.4 |
| 6 | −361.145 | | | |

| i | 1 | 3 | 5 |
|---|---|---|---|
| K | −15.16338 | 119.9333 | 0.056179 |
| a | −1.021410E−03 | 3.333290E−04 | −2.093480E−05 |
| b | 9.159980E−06 | −2.001340E−05 | −4.749710E−07 |
| c | −9.120820E−07 | 1.104570E−06 | 1.086950E−08 |
| d | 3.757890E−08 | −1.100160E−07 | −3.666320E−11 |

As for the sixth example, the total focal length F, the f-number of the zoom lens 5 and the distance D4 between the front lens group 10 and the rear lens group 20 vary as follows:

F: 28.00 to 34.20 to 52.64 f-number: 6.73 to 9.42 to 12.66

D4: 21.2939 to 14.9301 to 10.8678

In the sixth Example, the object side aspherical surface R1 of the first lens 11 satisfies the condition (2): $0.5<|(C_{as}-C)/(N-1)/\Phi_{G1}|<10$ in the range of $0.7Y_{max}<Y<1.0Y_{max}$. With regard to the object side aspherical surface R1 of the first lens 11, the value $|(C_{as}-C)/(N-1)/\Phi_{G1}|$ varies with the value Y in the range of $0.7Y_{max}<Y<1.0Y_{max}$ in the following manner.

| | $|(C_{as} - C)/(N - 1)/\Phi_{G1}|$ |
|---|---|
| $0.7\ Y_{max}$ | 1.064215 |
| $0.8\ Y_{max}$ | 1.362097 |
| $0.9\ Y_{max}$ | 1.589465 |
| $1.0\ Y_{max}$ | 1.55097 |

In the sixth example, the characteristic value D2/Fw= 0.449494/28.00≈0.0160. Accordingly, the sixth example satisfies the condition (1).

Aberration curves of the sixth example at the wide-angle terminal (F=28.00), at the middle focal length (F=34.20) and at the telephoto terminal (F=52.64) are shown in FIGS. 22A, 22B and 22C, FIGS. 23A, 23B and 23C and FIGS. 24A, 24B and 24C, respectively.

EXAMPLE 7

Figure 25:
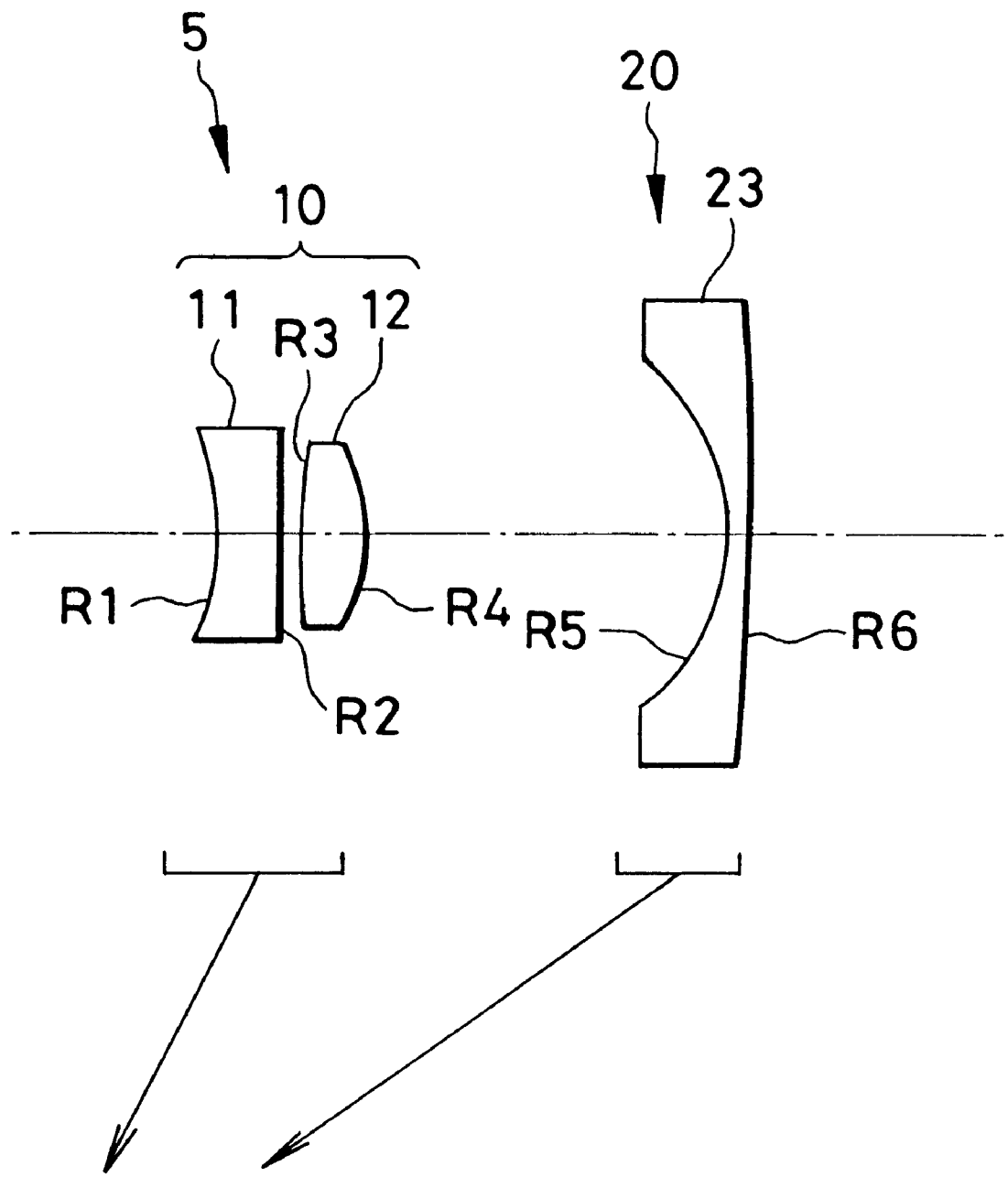
FIG. 25 is a schematic diagram showing a zoom lens according to Example 7 of the present invention, at a wide-angle terminal.
Figure 26C:
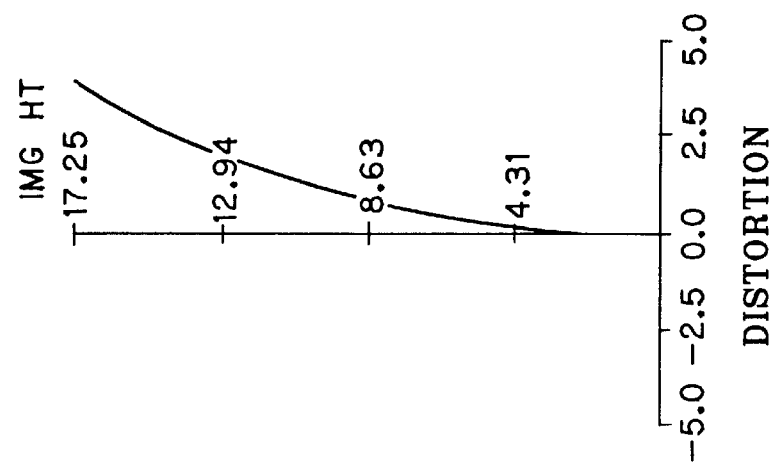
FIGS. 26A, 26B and 26C are diagrams showing aberration curves of the zoom lens according to Example 7 at the wide-angle terminal.
Figure 26B:
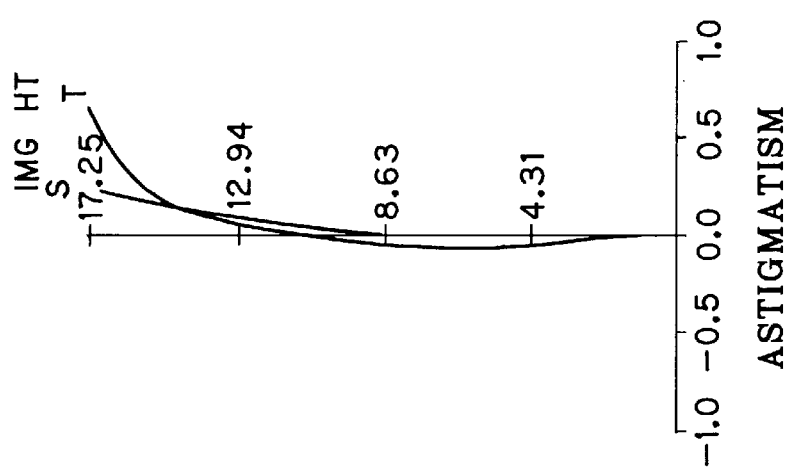
Figure 26A:
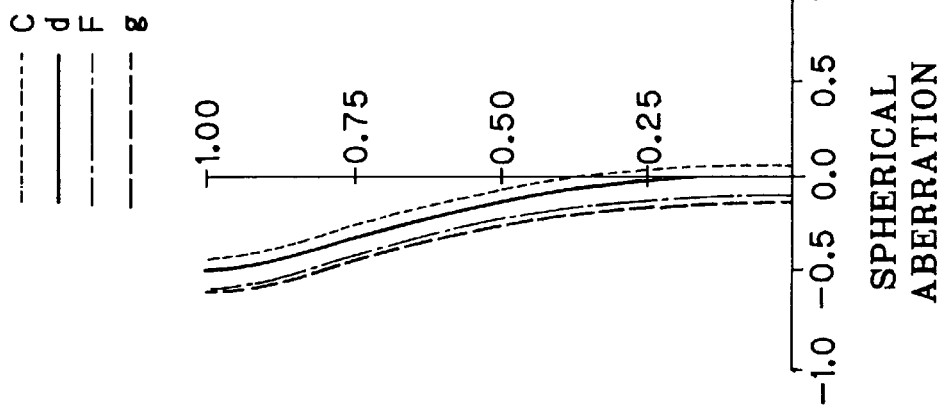
Figure 27C:
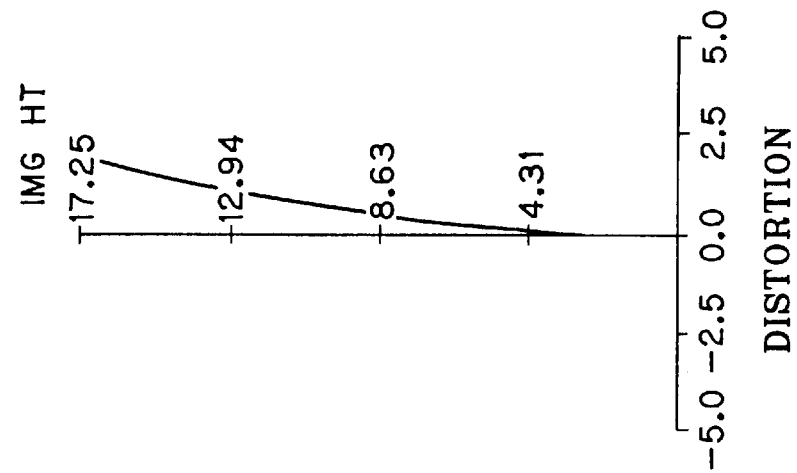
FIGS. 27A, 27B and 27C are diagrams showing aberration curves of the zoom lens according to Example 7 at a middle focal length.
Figure 27B:
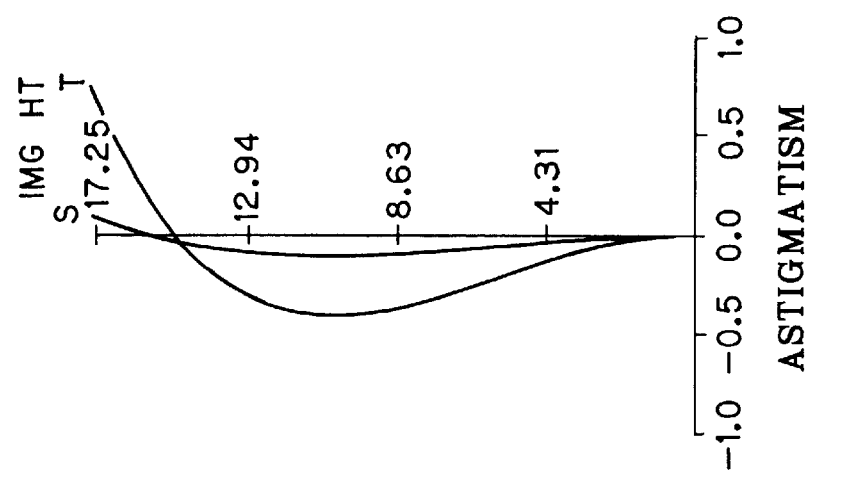
Figure 27A:
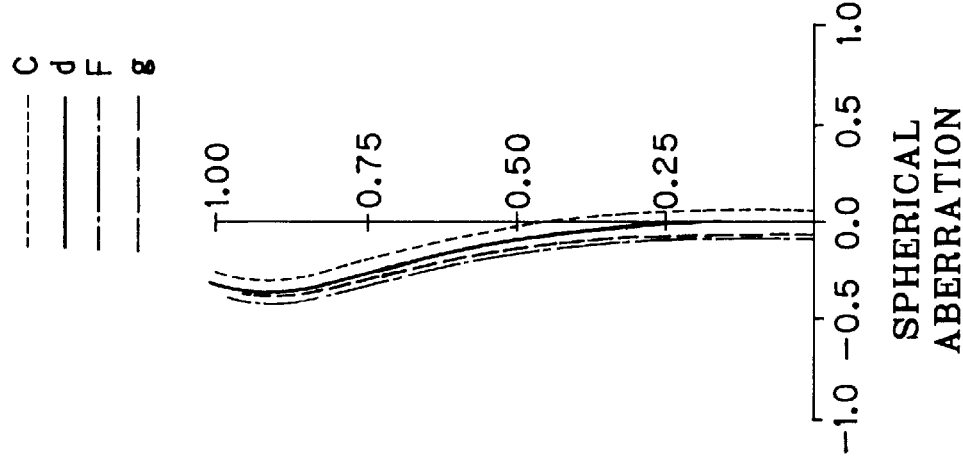
Figure 28C:
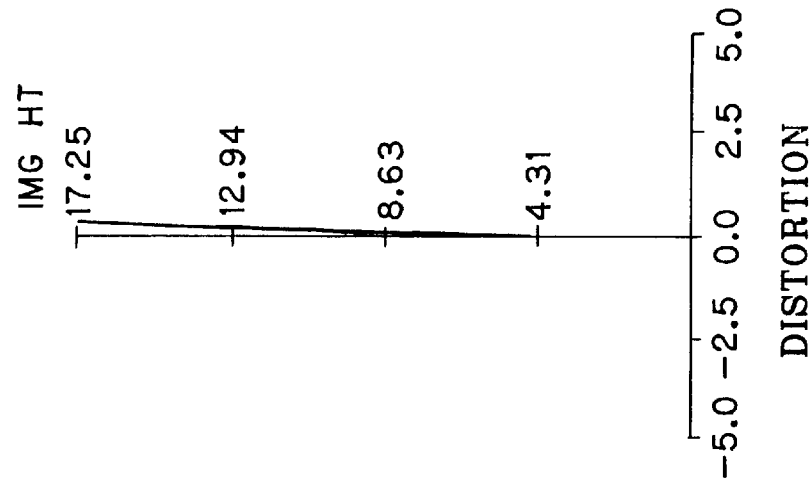
FIGS. 28A, 28B and 28C are diagrams showing aberration curves of the zoom lens according to Example 7, at a telephoto terminal.
Figure 28B:
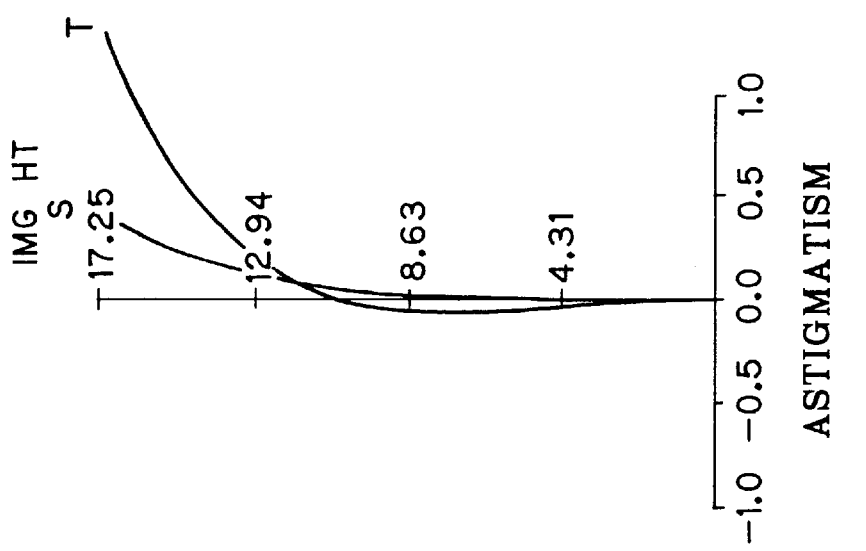
Figure 28A:
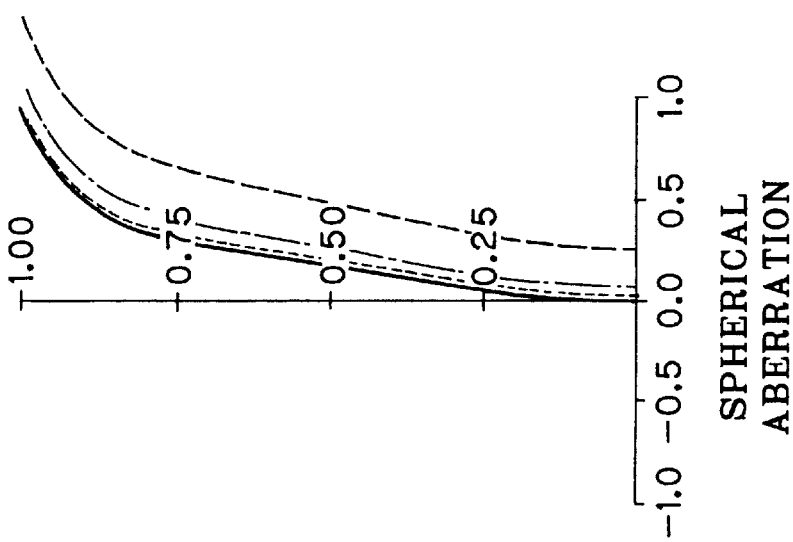

The composition of the zoom lens 5 of the seventh example of the present invention, as shown in FIG. 25, is fundamentally equal to that of the first Example, as shown by the same reference numbers as used in FIG. 1. In the seventh example, both surfaces R1 and R2 of a first lens 11 and an object side surface R5 of a third lense 23 are aspherical. The object side aspherical surface R1 of the first lens 11 satisfies the condition (1) in the range of $0.7Y_{max}<Y<1.0Y_{max}$.

Numerical values and aspherical coefficients of the seventh example will be described below.

EXAMPLE 7

| i | R (mm) | D (mm) | N | ν |
|---|---|---|---|---|
| 1 | −19.8996 (aspherical) | 3 | 1.755 | 27.6 |
| 2 | 487.302 (aspherical) | 1.08 | | |
| 3 | 53.2066 | 3 | 1.62668 | 58.9835 |
| 4 | −9.06012 | variable | | |
| 5 | −12.2814 (aspherical) | 1 | 1.624288 | 59.445 |
| 6 | −187.372 | | | |

| i | 1 | 2 | 5 |
|---|---|---|---|
| K | 6.21525 | −30 | 0.553798 |
| a | −4.453040E−04 | −1.371070E−04 | 1.942520E−05 |
| b | 4.704620E−06 | 5.865720E−06 | −7.415740E−08 |
| c | −3.823140E−07 | −1.754670E−07 | 4.702170E−09 |
| d | 1.038880E−08 | 1.233490E−08 | 8.320360E−11 |

As for the seventh example, the total focal length F, the f-number of the zoom lens 5 and the distance D4 between the front lens group 10 and the rear lens group 20 vary as follows:

F: 28.00 to 34.20 to 52.64
f-number: 6.73 to 9.42 to 12.66
D4: 17.0273 to 12.3284 to 9.32904

In the seventh Example, the object side aspherical surface R1 of the first lens 11 satisfies the condition (2): $0.5<|(C_{as}-C)/(N-1)/\Phi_{G1}|<10$ in the range of $0.7Y_{max}<Y<1.0Y^{max}$. With regard to the object side aspherical surface R1 of the first lens 11, the value $|(C_{as}-C)/(N-1)/\Phi_{G1}|$ varies with the value Y in the range of $0.7Y_{max}<Y<1.0Y_{max}$ in the following manner.

| | $|(C_{as} - C)/(N - 1)/\Phi_{G1}|$ |
|---|---|
| $0.7\,Y_{max}$ | 1.361551 |
| $0.8\,Y_{max}$ | 1.786749 |
| $0.9\,Y_{max}$ | 2.146858 |
| $1.0\,Y_{max}$ | 2.176913 |

In the seventh example, the characteristic value D2/Fw= 1.08/28.00≈0.039. Accordingly, the seventh example satisfies the condition (1).

Aberration curves of the seventh example at the wide-angle terminal (F=28.00), at the middle focal length (F=34.20) and at the telephoto terminal (F=52.64) are shown in FIGS. 26A, 26B and 26C, FIGS. 27A, 27B and 27C and FIGS. 28A, 28B and 28C, respectively.

What is claimed is:

1. A zoom lens comprising:
   a front lens group having a positive power, the front lens group consisting of a first lens having a negative power and a second lens having a positive power, the first lens and second lens being separated by an air gap; and
   a rear lens group having a negative power, the rear lens group being movable relative to the front lens group along an optical axis for zooming;
   wherein the first lens has at least one aspherical surface, and is spaced from the second lens by a distance, wherein the zoom lens satisfies the following condition:

$$0<D2/Fw<0.1 \tag{1}$$

wherein D2 is the distance between the first and second lenses, and Fw is a total focal length of the zoom lens at a wide-angle end;
   wherein the rear lens group consists of a third lens having a negative power.

2. A zoom lens according to claim 1, further satisfying the following condition:

$$0.5<|(C_{as}-C)/(N-1)/\Phi_{G1}|<10 \tag{2}$$

wherein C is a radius of curvature of a base surface of the aspherical surface, N is an index of refraction of a medium forming the first lens, $\Phi_{G1}$ is a power of refraction of the first lens, and $C_{as}$ is a local radius of curvature at a height Y relative to an optical axis, wherein $0.7\,Y_{max}<Y<1.0\,Y_{max}$, and $Y_{max}$ is a maximum effective aperture of the first lens.

3. A zoom lens comprising:
   a front lens group having a positive power, the front lens group consisting of a first lens having a negative power and a second lens having a positive power; and
   a rear lens group having a negative power, the rear lens group being movable relative to the front lens group along an optical axis for zooming;
   wherein the first lens has at least one aspherical surface, and is spaced from the second lens by a distance, wherein the zoom lens satisfies the following condition:

$$0<D2/Fw<0.1 \tag{1}$$

wherein D2 is the distance between the first and second lenses, and Fw is a total focal length of the zoom lens at a wide-angle end;
   wherein image side surfaces and object side surfaces of the first to third lenses are aspherical.

4. The zoom lens of claim 3, wherein the zoom lens satisfies the following condition:

$$0.5<|(C_{as}-C)/(N-1)/\Phi_{G1}|<10 \tag{2}$$

wherein C is a radius of curvature of a base surface of the aspherical surface, N is an index of refraction of a medium forming the first lens, $\Phi_{G1}$ is a power of refraction of the first lens, and $C_{as}$ is a local radius of curvature at a height Y relative to an optical axis, wherein $0.7Y_{max}<Y<1.0Y_{max}$, and $Y_{max}$ is a maximum effective aperture of the first lens.

5. The zoom lens of claim 4, wherein the rear lens group consists of a third lens having a negative power.

6. A zoom lens comprising:
   a front lens group having a positive power, the front lens group consisting of a first lens having a negative power and a second lens having a positive power; and
   a rear lens group having a negative power, the rear lens group being movable relative to the front lens group along an optical axis for zooming;
   wherein the first lens has at least one aspherical surface, and is spaced from the second lens by a distance, wherein the zoom lens satisfies the following condition:

$$0<D2/Fw<0.1 \tag{1}$$

wherein D2 is the distance between the first and second lenses, and Fw is a total focal length of the zoom lens at a wide-angle end;
   wherein image side surfaces and object side surfaces of the first and second lenses and an image side surface of the third lens are aspherical.

7. The zoom lens of claim 6, wherein the zoom lens satisfies the following condition:

$$0.5<|(C_{as}-C)/(N-1)/\Phi_{G1}|<10 \qquad (2)$$

wherein C is a radius of curvature of a base surface of the aspherical surface, N is an index of refraction of a medium forming the first lens, $\Phi_{G1}$ is a power of refraction of the first lens, and $C_{as}$ is a local radius of curvature at a height Y relative to an optical axis, wherein $0.7Y_{max}<Y<1.0Y_{max}$, and $Y_{max}$ is a maximum effective aperture of the first lens.

8. The zoom lens of claim 7, wherein the rear lens group consists of a third lens having a negative power.

9. A zoom lens comprising:
   a front lens group having a positive power, the front lens group consisting of a first lens having a negative power and a second lens having a positive power; and
   a rear lens group having a negative power, the rear lens group being movable relative to the front lens group along an optical axis for zooming;
   wherein the first lens has at least one aspherical surface, and is spaced from the second lens by a distance, wherein the zoom lens satisfies the following condition:

$$0<D2/Fw<0.1 \qquad (1)$$

wherein D2 is the distance between the first and second lenses, and Fw is a total focal length of the zoom lens at a wide-angle end;
   wherein image side surfaces and object side surfaces of the first and second lenses and an object side surface of the third lens are aspherical.

10. The zoom lens of claim 9, wherein the zoom lens satisfies the following condition:

$$0.5<|(C_{as}-C)/(N-1)/\Phi_{G1}|<10 \qquad (2)$$

wherein C is a radius of curvature of a base surface of the aspherical surface, N is an index of refraction of a medium forming the first lens, $\Phi_{G1}$ is a power of refraction of the first lens, and $C_{as}$ is a local radius of curvature at a height Y relative to an optical axis, wherein $0.7Y_{max}<Y<1.0Y_{max}$, and $Y_{max}$ is a maximum effective aperture of the first lens.

11. The zoom lens of claim 10, wherein the rear lens group consists of a third lens having a negative power.

12. A zoom lens comprising:
   a front lens group having a positive power, the front lens group consisting of a first lens having a negative power and a second lens having a positive power; and
   a rear lens group having a negative power, the rear lens group being movable relative to the front lens group along an optical axis for zooming;
   wherein the first lens has at least one aspherical surface, and is spaced from the second lens by a distance, wherein the zoom lens satisfies the following condition:

$$0<D2/Fw<0.1 \qquad (1)$$

wherein D2 is the distance between the first and second lenses, and Fw is a total focal length of the zoom lens at a wide-angle end;
   wherein object side surfaces of the first to third lenses are aspherical.

13. The zoom lens of claim 12, wherein the zoom lens satisfies the following condition:

$$0.5<|(C_{as}-C)/(N-1)/\Phi_{G1}|<10 \qquad (2)$$

wherein C is a radius of curvature of a base surface of the aspherical surface, N is an index of refraction of a medium forming the first lens, $\Phi_{G1}$ is a power of refraction of the first lens, and $C_{as}$ is a local radius of curvature at a height Y relative to an optical axis, wherein $0.7Y_{max}<Y<1.0Y_{max}$, and $Y_{max}$ is a maximum effective aperture of the first lens.

14. The zoom lens of claim 13, wherein the rear lens group consists of a third lens having a negative power.

15. A zoom lens comprising:
   a front lens group having a positive power, the front lens group consisting of a first lens having a negative power and a second lens having a positive power; and
   a rear lens group having a negative power, the rear lens group being movable relative to the front lens group along an optical axis for zooming;
   wherein the first lens has at least one aspherical surface, and is spaced from the second lens by a distance, wherein the zoom lens satisfies the following condition:

$$0<D2/Fw<0.1 \qquad (1)$$

wherein D2 is the distance between the first and second lenses, and Fw is a total focal length of the zoom lens at a wide-angle end;
   wherein the rear lens group consists of a third lens having a negative power;
   said zoom lens further satisfying the following condition:

$$0.5<|(C_{as}-C)/(N-1)/\Phi_{G1}|<10 \qquad (2)$$

wherein C is a radius of curvature of a base surface of the aspherical surface, N is an index of refraction of a medium forming the first lens, $\Phi_{G1}$ is a power of refraction of the first lens, and $C_{as}$ is a local radius of curvature at a height Y relative to an optical axis, wherein $0.7Y_{max}<Y<1.0Y_{max}$, and $Y_{max}$ is a maximum effective aperture of the first lens.

16. A zoom lens according to claim 15, wherein image side surfaces and object side surfaces of the first and second lenses are aspherical, and the image side surface of the first lens satisfies the above condition (2).

17. A zoom lens according to claim 15, wherein an image side surface and an object side surface of the first lens are aspherical, and the object side surface of the first lens satisfies the above condition (2).

18. A zoom lens according to claim 15, wherein an image side surface and an object side surface of the first lens and an object side surface of the third lens are aspherical, and the object side surface of the first lens satisfies the above condition (2).

19. A zoom lens comprising:
   a front lens group having a positive power, the front lens group consisting of a first lens having a negative power and a second lens having a positive power; and
   a rear lens group having a negative power, the rear lens group being movable relative to the front lens group along an optical axis for zooming;
   wherein the first lens has at least one aspherical surface, and is spaced from the second lens by a distance, wherein the zoom lens satisfies the following condition:

$$0<D2/Fw<0.1 \qquad (1)$$

wherein D2 is the distance between the first and second lenses, and Fw is a total focal length of the zoom lens at a wide-angle end;

wherein the rear lens group consists of a third lens having a negative power;

said zoom lens further satisfying the following condition:

$$1.8 < |(C_{as}-C)/(N-1)/\Phi_{G1}| < 10 \qquad (2)$$

wherein C is a radius of curvature of a base surface of the aspherical surface, N is an index of refraction of a medium forming the first lens, $\Phi_{G1}$ is a power of refraction of the first lens, and $C_{as}$ is a local radius of curvature at a height Y relative to an optical axis, wherein $0.7Y_{max} < Y < 1.0Y_{max}$ and $Y_{max}$ is a maximum effective aperture of the first lens.

20. A zoom lens according to claim 19, wherein image side surfaces and object side surfaces of the first and second lenses are aspherical, and the image side surface of the first lens satisfies the above condition (2).

21. A zoom lens according to claim 19, wherein an image side surface and an object side surface of the first lens are aspherical, and the object side surface of the first lens satisfies the above condition (2).

22. A zoom lens according to claim 19, wherein an image side surface and an object side surface of the first lens and an object side surface of the third lens are aspherical, and the object side surface of the first lens satisfies the above condition (2).

* * * * *